US011019360B2

(12) United States Patent
Ramasubramonian et al.

(10) Patent No.: US 11,019,360 B2
(45) Date of Patent: May 25, 2021

(54) GENERALIZED REFERENCE SAMPLE DERIVATION METHODS FOR INTRA PREDICTION IN VIDEO CODING

(71) Applicant: QUALCOMM Incorporated, San Diego, CA (US)

(72) Inventors: Adarsh Krishnan Ramasubramonian, Irvine, CA (US); Geert Van der Auwera, Del Mar, CA (US); Luong Pham Van, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/824,431

(22) Filed: Mar. 19, 2020

(65) Prior Publication Data

US 2020/0304832 A1    Sep. 24, 2020

Related U.S. Application Data

(60) Provisional application No. 62/821,907, filed on Mar. 21, 2019.

(51) Int. Cl.
*H04N 19/593* (2014.01)
*H04N 19/176* (2014.01)
(Continued)

(52) U.S. Cl.
CPC ......... *H04N 19/593* (2014.11); *H04N 19/105* (2014.11); *H04N 19/176* (2014.11); *H04N 19/70* (2014.11)

(58) Field of Classification Search
None
See application file for complete search history.

(56) References Cited

U.S. PATENT DOCUMENTS

| 2015/0201204 A1* | 7/2015 | Chen | H04N 19/33 |
| | | | 375/240.02 |
| 2019/0260989 A1* | 8/2019 | Racape | H04N 19/46 |

(Continued)

OTHER PUBLICATIONS

"Information technology—Dynamic Adaptive Streaming over HTTP {DASH}—Part 1: Media Presentation Description and Segment Formats," ISO/IEC 23009-1, International Standard, Draft third edition, Jan. 9, 2017, 216 pp.

(Continued)

*Primary Examiner* — Rebecca A Volentine
(74) *Attorney, Agent, or Firm* — Shumaker & Sieffert, P.A.

(57) ABSTRACT

In some examples, a device includes a memory configured to store a current block of the video data and one or more processors coupled to the memory. The one or more processors may be configured to derive a reference sample position (RSP) for a current sample of a current block according to one or more RSP derivation models. The one or more RSP derivation models may include a circular model, an elliptical model, a piece-wise linear model, a table-based model, or a parametric model. The one or more processors may be further configured to determine a reference sample value for a reference sample at the RSP, determine a predicted value for the current sample using the reference sample value, and code the current sample using the predicted value.

28 Claims, 26 Drawing Sheets

(51) Int. Cl.
*H04N 19/70* (2014.01)
*H04N 19/105* (2014.01)

(56) References Cited

U.S. PATENT DOCUMENTS

| | | |
|---|---|---|
| 2019/0306513 A1 | 10/2019 | Van Der Auwera et al. |
| 2020/0007895 A1 | 1/2020 | Van Der Auwera et al. |
| 2020/0145648 A1* | 5/2020 | Lee ............... H04N 19/593 |

OTHER PUBLICATIONS

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pages.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Ohm J-R., et al., "MPEG-4 Advanced Video Coding", MPEG Doc#: N7314, Jul. 2005, 11 Pages.

Van Der Auwera G., et al., "Extension of Simplified PDPC to Diagonal Intra Modes", 10th JVET Meeting, Apr. 10, 2018-Apr. 20, 2018, San Diego, (The Joint Video Exploration Team of ISO/IEC JTC1/SC29/WG11 and ITU-T SG.16), JVET-J0069_r1, Apr. 2018, pp. 1-4.

Yao S., et al., "Non-CE3: Intra Prediction Information Coding", Joint Video Experts Team (JVET) of ITU-T SG 16 WP and ISO/IEC JTC 1/SC 29/WG 11, Document: JVET-M0210-V3, 13th Meeting: Marrakech, MA, Jan. 9-18, 2019, JVET-M0210-r2, pp. 1-7.

Zhao L., et al., "CE3-related: Unification of Angular Intra Prediction for Square and Non-square Blocks," 12, JVET Meeting, Oct. 3, 2018-Oct. 12, 2018, Macao, (The Joint Video Exploration Team of ISO/IEC JTC1/SC29/WG11 and ITU-T SG.16 ), No. JVET-L0279, Oct. 6, 2018 (Oct. 6, 2018), XP030195082, pp. 1-10, Retrieved from the Internet: URL: http://phenix.int-evry.fr/jvet/doc_end_user/documents/12_Macao/wg11/JVET-L0279-v3.zip JVET-L0279-v1.docx [retrieved on Oct. 6, 2018] cited in the application the whole document.

Zhao X., et al., "EE1 Related: Simplification and Extension of PDPC", 8th JVET Meeting; Oct. 18, 2017-Oct. 25, 2017; Macau; (The Joint Video Exploration Team of ISO/IEC JTC1/SC29/WG11 and ITU-T SG.16); URL: http://phenix.int-evry.fr/jvet/,,No. JVET-H0057-r1, Oct. 11, 2017, XP030151049, cited in the application, Section 1 Proposed method, 4 pages.

Bossen F., et al., "Non-CE3: A Unified Luma Intra Mode list Construction Process", Joint Video Experts Team (JVET) of ITU-T SG 16 WP 3 and ISO/IEC JTC 1/SC 29/WG 11, Document: JVET-M0528-r1, 13th Meeting: Marrakech, MA, Jan. 9-18, 2019, pp. 1-4.

Bross B., et al., "Versatile Video Coding (Draft 23)", JVET-L1001-V1, Joint Video Experts Team (JVET) of ITU-T SG 16 WP 3 and ISO/IEC JTC 1/SC 29/WG 11, 12th Meeting: Macao, CN, Oct. 3-12, 2018, 165 Pages.

Bross B., et al., "Versatile Video Coding (Draft 4)", Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-V7, 299 Pages.

Chen J., et al., "Algorithm description for Versatile Video Coding and Test Model 2 (VTM 2)", Joint Video Experts Team (JVET) of ITU-T SG 16 WP 3 and ISO/IEC JTC 1/SC 29/WG 11, JVET-K1002-v2, 11th Meeting: Ljubljana, SI, Jul. 10-18, 2018, pp. 1-21.

Chen J., et al., "Algorithm description for Versatile Video Coding and Test Model 3 (VTM 3)", Joint Video Experts Team (JVET) of ITU-T SG 16 WP 3 and ISO/IEC JTC 1/SC 29/WG 11, JVET-L1002-v2, 12th Meeting: Macao, CN, Oct. 3-12, 2018, Doc: JVET-L1002, 48 pages.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ , No. JVET-A1001 Feb. 24, 2016 (Feb. 24, 2016), XP030150000, 27 pages.

Chen Y., et al., "Description of SDR, HDR and 360 Degree Video Coding Technology Proposal by Qualcomm and Technicolor-Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.

Ergen S., "ZigBee/IEEE 802.15.4 Summary", Sep. 10, 2004, 37 Pages.

IEEE Std 802.11ad-2012: "Part 11: Wireless LAN Medium Access Control (MAC) and Physical Layer (PHY) Specifications—Amendment 3: Enhancements for Very High Throughput in the 60 GHz Band", LAN/MAN Standards Committee of the IEEE Computer Society, Dec. 28, 2012, 628 Pages.

Chen J., et al., "JVET-G1001: Algorithm Description of Joint Exploration Test Model 7 (JEM7)", JVET-G1001-V1, Joint Video Exploration Team (JVET)of ITU-T SG 16 WP 3 and ISO/IEC JTC 1/SC 291WG 11, 7th Meeting, Jul. 13, 2017-Jul. 21, 2017, Torino, Aug. 19, 2017 (Aug. 19, 2017), 51 Pages. XP030150980, pp. i-iv, Retrieved from the Internet: URL: http://phenix.int-evry.fr/jvet/doc_end_user/documents/7_Torino/wg11/JVET-Goo o1-v1.zip.

* cited by examiner

| predModeIntra | -10 | -9 | -8 | -7 | -6 | -5 | -4 | -3 | -2 | -1 |  |  |  |
|---|---|---|---|---|---|---|---|---|---|---|---|---|---|
| intraPredAngle | 128 | 102 | 86 | 73 | 64 | 57 | 51 | 45 | 39 | 35 | 32 | 29 | 26 |
| predModeIntra | 9 | 10 | 11 | 12 | 13 | 14 | 15 | 16 | 17 | *18* | 19 | 20 | 21 |
| intraPredAngle | 14 | 12 | 10 | 8 | 6 | 4 | 3 | 2 | 1 | *0* | -1 | -2 | -3 |
| predModeIntra | 26 | 27 | 28 | 29 | 30 | 31 | 32 | 33 | 34 | 35 | 36 | 37 | 38 |
| intraPredAngle | -12 | -14 | -16 | -18 | -20 | -23 | -26 | -29 | -32 | -29 | -26 | -23 | -20 |
| predModeIntra | 43 | 44 | 45 | 46 | 47 | 48 | 49 | *50* | 51 | 52 | 53 | 54 | 55 |
| intraPredAngle | -10 | -8 | -6 | -4 | -3 | -2 | -1 | *0* | 1 | 2 | 3 | 4 | 6 |
| predModeIntra | 60 | 61 | 62 | 63 | 64 | 65 | 66 | 67 | 68 | 69 | 70 | 71 | 72 |
| intraPredAngle | 16 | 18 | 20 | 23 | 26 | 29 | 32 | 35 | 39 | 45 | 51 | 57 | 64 |
| predModeIntra | 77 | 78 | 79 | 80 |  |  |  |  |  |  |  |  |  |
| intraPredAngle | 171 | 256 | 341 | 512 |  |  |  |  |  |  |  |  |  |

| predModeIntra | 2 | 3 | 4 | 5 | 6 | 7 | 8 | -14 | -13 | -12 | -11 |
|---|---|---|---|---|---|---|---|---|---|---|---|
| intraPredAngle | 32 | 29 | 26 | 23 | 20 | 18 | 16 | 512 | 341 | 256 | 171 |
| predModeIntra | 22 | 23 | 24 | 25 |  |  |  |  |  |  |  |
| intraPredAngle | -4 | -6 | -8 | -10 |  |  |  |  |  |  |  |
| predModeIntra | 39 | 40 | 41 | 42 |  |  |  |  |  |  |  |
| intraPredAngle | -18 | -16 | -14 | -12 |  |  |  |  |  |  |  |
| predModeIntra | 56 | 57 | 58 | 59 |  |  |  |  |  |  |  |
| intraPredAngle | 8 | 10 | 12 | 14 |  |  |  |  |  |  |  |
| predModeIntra | 73 | 74 | 75 | 76 |  |  |  |  |  |  |  |
| intraPredAngle | 73 | 86 | 102 | 128 |  |  |  |  |  |  |  |

FIG. 10

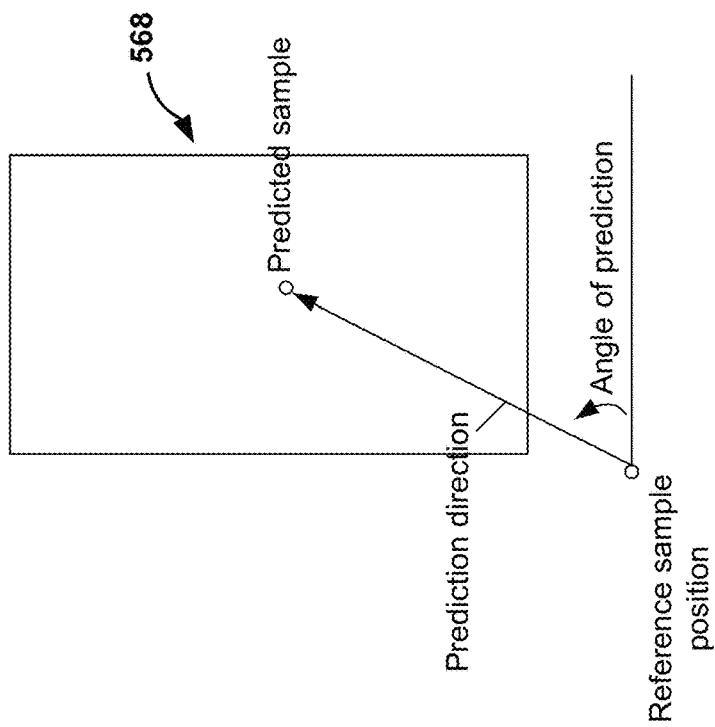
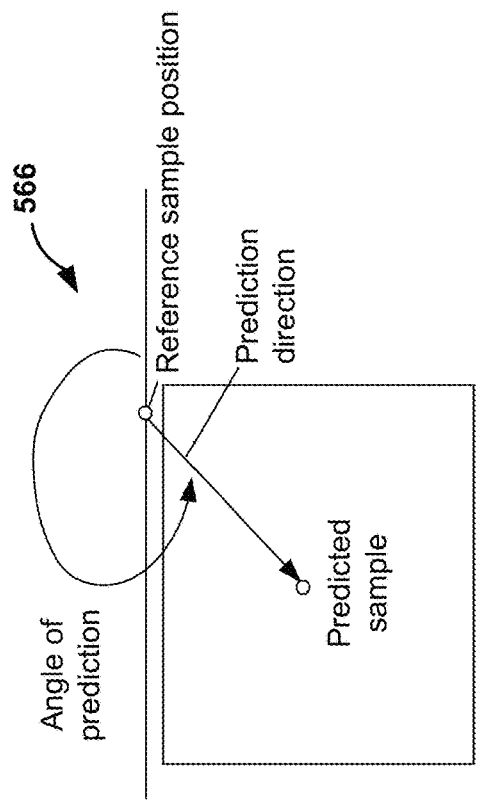
FIG. 12

GENERALIZED REFERENCE SAMPLE DERIVATION METHODS FOR INTRA PREDICTION IN VIDEO CODING

This application claims the benefit of U.S. Provisional Patent Application 62/821,907, filed Mar. 21, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques that may improve intra prediction in video coding. Intra prediction typically involves a linear prediction mode such as an angular mode or a non-angular mode (e.g., planar or DC). Linear prediction modes may be useful in predicting blocks with linear features, such as edges that are straight. However, content in video data often contains elements that are not well predicted using a linear prediction mode, such as content with curved edges. Typically, to predict content with curved edges a video encoder may split a block into smaller blocks. Splitting blocks into smaller blocks may increase signaling overhead and thereby decrease compression efficiency. The techniques of this disclosure may improve intra prediction when content is not well predicted using a linear prediction mode. The details of one or more examples are set forth in the accompanying drawings and the description below. Other features, objects, and advantages will be apparent from the description, drawings, and claims.

In one example, this disclosure describes a method including deriving a reference sample position (RSP) for a current sample of a current block according to one or more RSP derivation models, wherein the one or more RSP derivation models comprise a circular model, an elliptical model, a piece-wise linear model, a table-based model, or a parametric model; determining a reference sample value for a reference sample at the RSP; determining a predicted value for the current sample using the reference sample value; and coding the current sample using the predicted value.

In another example, this disclosure describes a device for coding video data including a memory configured to store a current block of the video data; and one or more processors coupled to the memory, the one or more processors configured to: derive an RSP for a current sample of a current block according to one or more RSP derivation models, wherein the one or more RSP derivation models comprise a circular model, an elliptical model, a piece-wise linear model, a table-based model, or a parametric model; determine a reference sample value for a reference sample at the RSP; determine a predicted value for the current sample using the reference sample value; and code the current sample using the predicted value.

In yet another example, this disclosure describes a device for coding video data including means for deriving an RSP for a current sample of a current block according to one or more RSP derivation models, wherein the one or more RSP derivation models comprise a circular model, an elliptical model, a piece-wise linear model, a table-based model, or a parametric model; means for determining a reference sample value for a reference sample at the RSP; means for determining a predicted value for the current sample using the reference sample value; and means for coding the current sample using the predicted value.

In another example, this disclosure describes a non-transitory computer-readable storage medium having stored thereon instructions that, when executed, cause one or more processors to derive an RSP for a current sample of a current block according to one or more RSP derivation models, wherein the one or more RSP derivation models comprise a circular model, an elliptical model, a piece-wise linear model, a table-based model, or a parametric model; determine a reference sample value for a reference sample at the RSP; determine a predicted value for the current sample using the reference sample value; and code the current sample using the predicted value.

BRIEF DESCRIPTION OF DRAWINGS

FIG. 10 is a table showing a specification of intraPredAngle.

FIG. 12 is a conceptual diagram illustrating angular intra prediction that can predict structures with straight edges.

DETAILED DESCRIPTION

The present disclosure describes techniques for intra prediction in video coding. The techniques of this disclosure may be useful and improve compression efficiency for intra prediction of video content with features that are non-linear (e.g., curved) when compared to linear intra prediction modes (e.g., angular, planar and DC). Content in video data may be non-linear in nature, such as curved. When content is non-linear, blocks of video data typically are split into smaller blocks which may increase the number of bits a video encoder may have to signal and a video decoder may have to determine from the video encoder's signaling. The techniques of this disclosure may reduce the number of blocks that are split and thereby reduce signaling overhead when compared to linear modes.

The techniques of this disclosure include techniques which a video encoder and/or video decoder may use to determine a reference sample position (RSP) for intra prediction. An RSP is a location of a reference sample used to predict a current block of video data. In some examples, a video encoder and/or video decoder may use one or more of a circular, an elliptical, a piece-wise linear, a table-based, or a parametric model to derive an RSP. By using a circular, elliptical, piece-wise linear, table-based or parametric model, a video encoder and video decoder may be able to better identify an appropriate RSP for non-linear video content than with typical angular modes of intra prediction.

Figure 1:
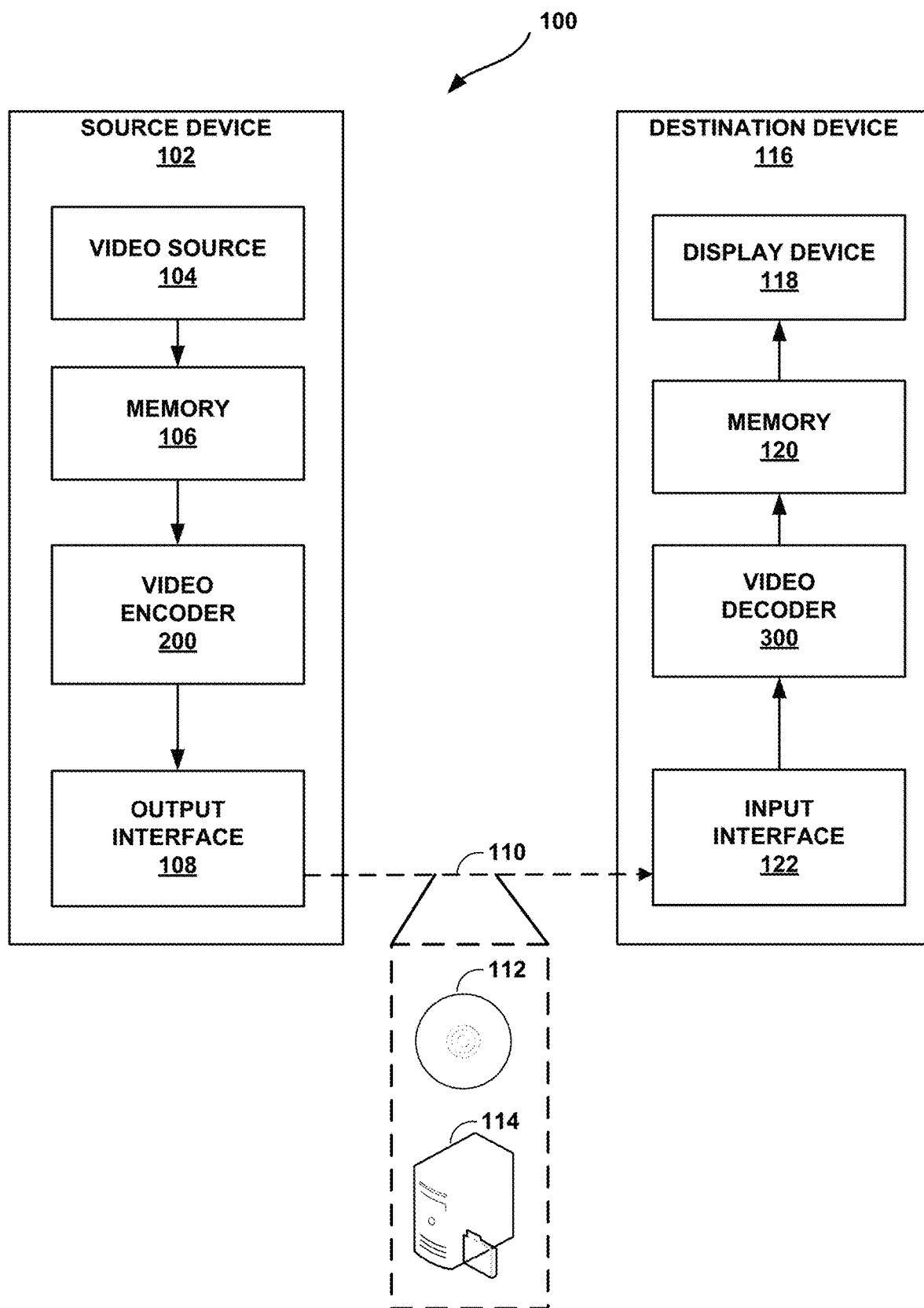
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for generalized reference sample derivation for intra prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for generalized reference sample derivation for intra prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memory 106 and memory 120 may store raw video data, e.g., raw video from video source 104 and raw, decoded video data from video decoder 300. Additionally or alternatively, memory 106 and memory 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memory 106 and memory 120 may store encoded video data, e.g., output from video encoder 200 and input to video decoder 300. In some examples, portions of memory 106 and memory 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 may receive an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13$^{th}$ Meeting: Marrakech, Mass., 9-18 Jan. 2019, JVET-M1001-v7 (hereinafter "VVC Draft 4" or "VVC WD4"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

Position dependent intra prediction is now discussed. Intra prediction is prediction using samples within the same picture. Block-based intra prediction is part of many video standards such AVC, HEVC, VVC, among others. Typically, lines (such as rows or columns) of reference samples from adjacent reconstructed blocks are used for predicting samples within the current block. One or multiple lines of samples may be used for prediction. The reference samples are employed by typical intra prediction modes such as DC, planar, and angular/directional modes. In other words, video encoder 200 and video decoder 300 when using intra prediction modes, such as DC, planar and angular/directional modes, use reference samples from adjacent reconstructed blocks to predict samples within the current block.

Position Dependent Intra Prediction Combination (PDPC) was described in ITU-T SG16/Q6 Doc. COM16-C1046, "Position Dependent intra Prediction Combination (PDPC)" and further simplified in X. Zhao, V. Seregin, A. Said, M. Karczewicz, "EE1 related: Simplification and extension of PDPC", 8$^{th}$ JVET Meeting, Macau, October 2018, JVET-H0057. In M. Karczewicz et al., "Description of SDR, HDR and 360° video coding technology proposal by Qualcomm," 10$^{th}$ JVET Meeting, San Diego, Calif., USA, April 2018, JVET-J0021, PDPC is applied to planar, DC, horizontal and vertical modes without signaling. In G. Van der Auwera, V. Seregin, A. Said, M. Karczewicz, "Extension of Simplified PDPC to Diagonal Intra Modes," 10$^{th}$ JVET Meeting, San Diego, Calif., USA, April 2018, JVET-J0069, PDPC was further extended to diagonal directional modes and modes adjacent to diagonal directional modes.

Figure 2A:
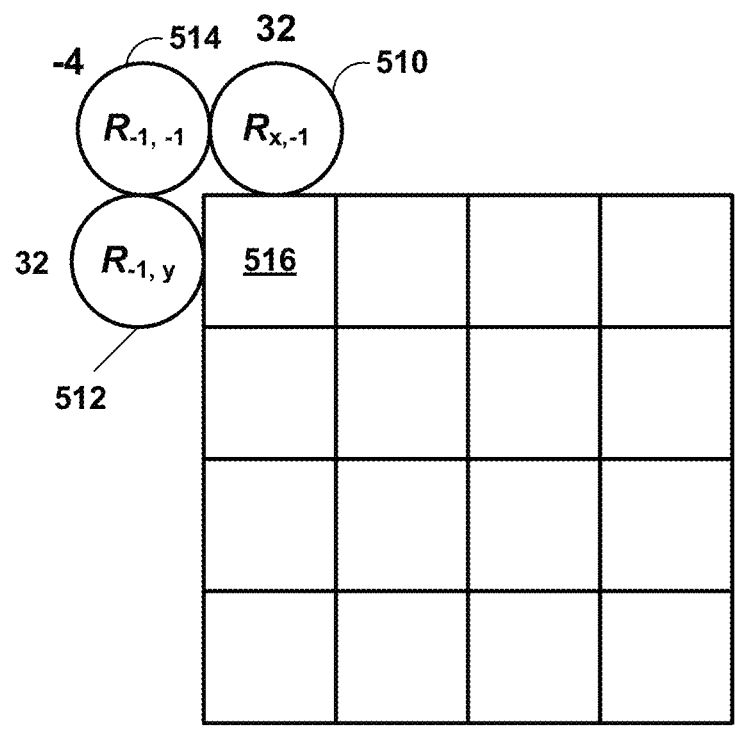
FIG. 2A and FIG. 2B illustrate DC mode Position Dependent Intra Prediction Combination (PDPC) weights (wL, wT, wTL) for (0, 0) and (1, 0) positions, respectively, inside one 4×4 block.

The prediction sample pred(x,y) located at (x, y) may be predicted with an intra prediction mode (DC, planar, angular) and its value may be modified using the PDPC expression for a single reference sample line:

$$\text{pred}(x,y)=(wL \times R_{-1,y}+wT \times R_{x,-1}-wTL \times R_{-1,-1}+ \\ (64-wL-wT+wTL) \times \text{pred}(x,y)+32)>>6, \quad \text{(Eq. 1)}$$

where $R_{x,-1}$, $R_{-1,y}$ represent the reference samples located at the top and left of the current sample (x, y), respectively, and $R_{-1,-1}$ represents the reference sample located at the top-left corner of the current block as shown in FIG. 2A. wL, wT and wTL represent weights for the left, top and top left samples, respectively. For the DC mode, the weights are calculated as follows for a block with dimensions width and height:

$$wT=32>>((y<<1)>>\text{shift}), wL=32>>((x<<1)>>\text{shift}), \\ wTL=(wL>>4)+(wT>>4),$$

with shift=(log$_2$(width)+log$_2$(height)+2)>>2, while for planar mode wTL=0, for horizontal mode wTL=wT and for vertical mode wTL=wL. The PDPC weights can be calculated with adds and shifts only. The value of pred(x,y) can be computed in a single step using Eq. 1.

Figure 2B:
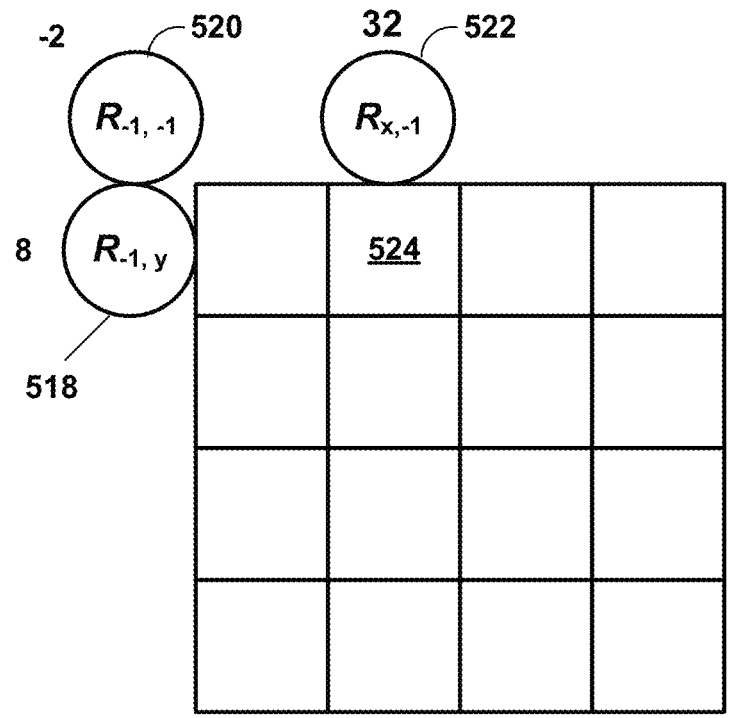

FIG. 2A and FIG. 2B illustrate example DC mode PDPC weights (wL, wT, wTL) for (0, 0) and (1, 0) positions, respectively, inside one 4×4 block. In other words, FIG. 2A and FIG. 2B show examples of DC mode PDPC weights for sample positions (0,0) 516 and (1,0) 524 inside a 4×4 block, respectively. For example, in FIG. 2A, a current 4×4 block of video data is depicted with example DC mode PDPC weights for position (0, 0) within the current block. Sample $R_{-1,y}$ 512 is a left sample and has a weight, wL, of 32. Sample $R_{-1,-1}$ 514 is a top left sample and has a weight, wTL, of −4. Sample $R_{x,-1}$ 510 is a top sample and has a weight, wT, of 32. In FIG. 2B, a current 4×4 block of video data is depicted with example DC mode PDPC weights for position (1, 0) within the current block. Sample $R_{-1,y}$ 518 is a left sample and has a weight, wL, of 8. Sample $R_{-1,-1}$ 520 is a top left sample and has a weight, wTL, of −2. Sample $R_{x,-1}$ 522 is a top sample and has a weight, wT, of 32.

If video encoder 200 and video decoder 300 apply PDPC to DC, planar, horizontal, and vertical intra modes, additional boundary filters are not applied by video encoder 200 and video decoder 300, such as the DC mode boundary filter or horizontal/vertical mode edge filters.

Equation 1 may be generalized to include additional reference sample lines. In this case, multiple reference samples are available in the neighborhoods of $R_{x,-1}$, $R_{-1,y}$, $R_{-1,-1}$ and each may have a weight assigned that can be optimized, for example, by training.

Figure 3:
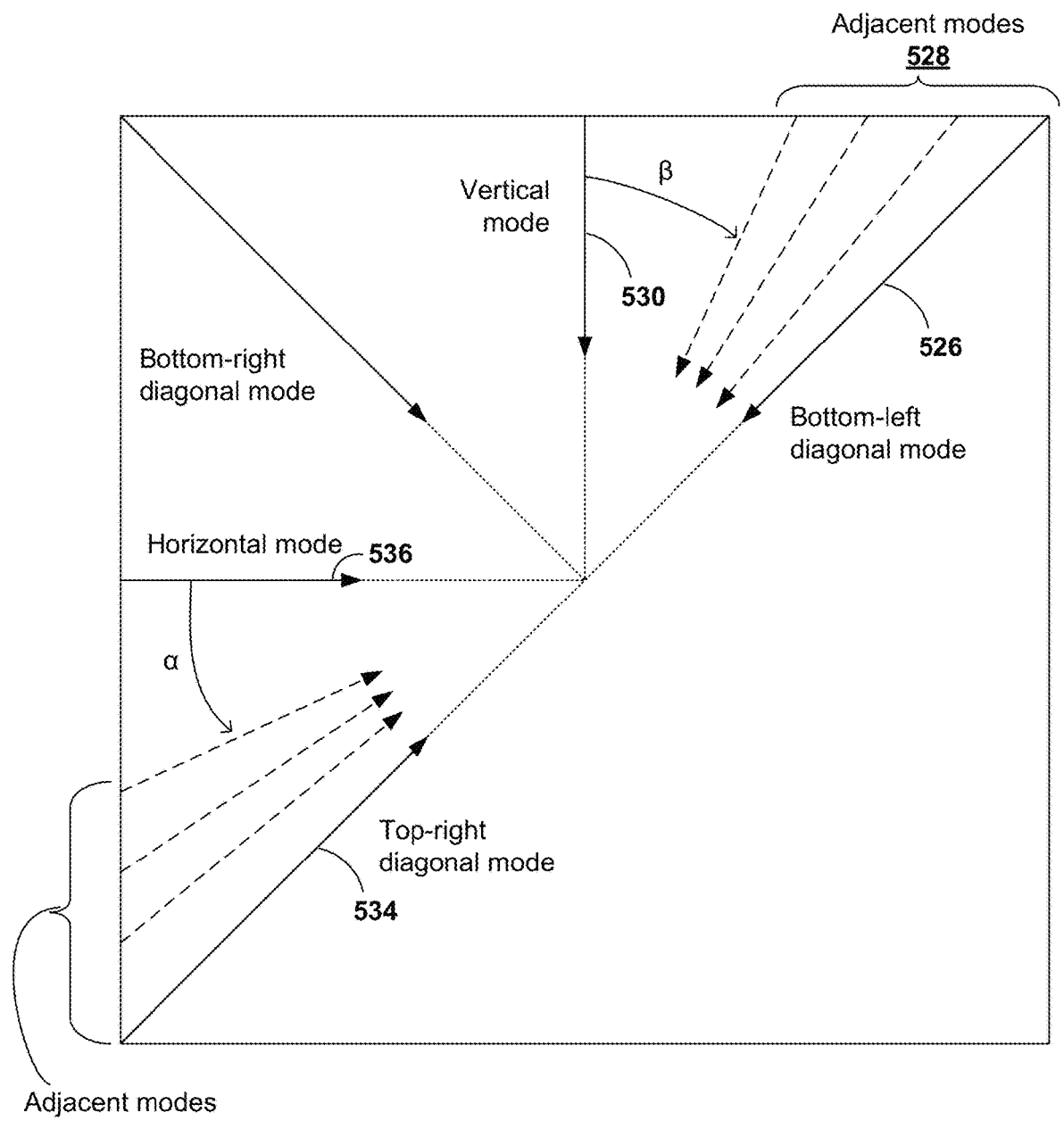
FIG. 3 is a conceptual diagram illustrating intra prediction angular modes.

U.S. Patent Publication No. 2019-0306513 A1, published on Oct. 3, 2019, discloses extending PDPC to the diagonal intra modes and to the angular modes that are adjacent to the diagonal modes as described below and shown in FIG. 3. The intended diagonal intra modes are the modes that predict according to the bottom-left and top-right directions, as well as several adjacent angular modes, for example, N adjacent modes 528 between the bottom-left diagonal mode 526 and vertical mode 530, and N or M adjacent modes 532 between the top-right diagonal mode 534 and horizontal mode 536. In other words, the diagonal intra modes and to the angular modes that are adjacent to the diagonal modes to which PDPC is extended are the modes that predict according to the bottom-left and top-right directions, as well as the several adjacent angular modes. FIG. 3 illustrates the identification of the angular modes. In other words, FIG. 3 is a conceptual diagram illustrating intra prediction angular modes. In general, the adjacent modes may be a selected subset of available angular modes. The spacing between angular modes may be nonuniform and some angular modes may be skipped.

Figure 4A:
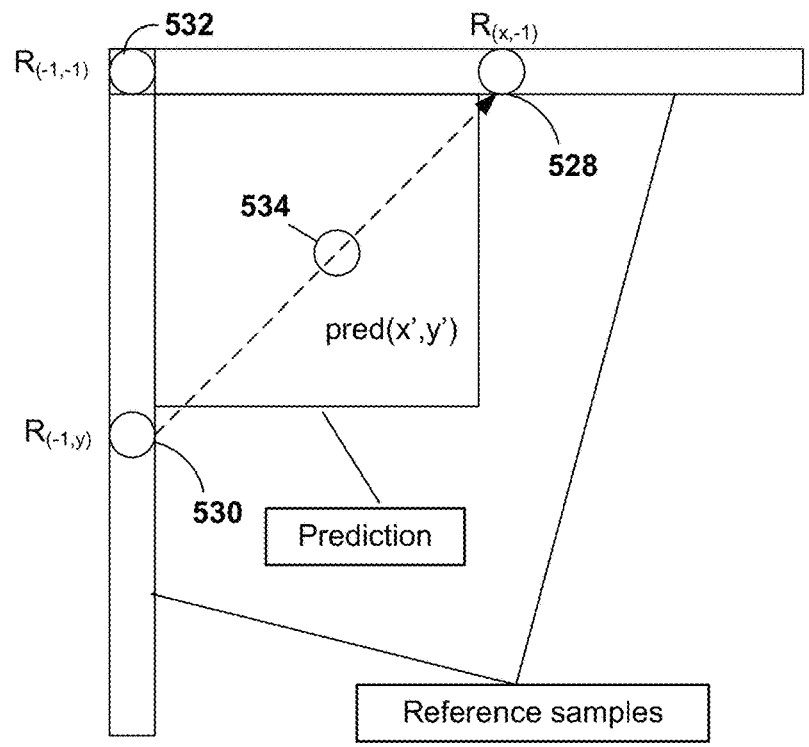
FIGS. 4A, 4B, 4C, and 4D are conceptual diagrams illustrating definitions of samples used by PDPC extension to diagonal and adjacent angular intra modes.

FIG. 4A illustrates the definition of reference samples $R_{x,-1}$ 528, $R_{-1,y}$ 530 and $R_{-1,-1}$ 532 for the extension of PDPC to the top-right diagonal mode. The prediction sample pred(x', y') 534 is located at (x', y') within the prediction block. The coordinate x of the reference sample $R_{x,-1}$ 528 is given by: x=x'+y'+1, and the coordinate y of the reference sample $R_{-1,y}$ 530 is similarly given by: y=x'+y'+1. The PDPC weights for the top-right diagonal mode may be, for example:

$$wT=16>>((y'<<1)>>\text{shift}), wL=16>>$$
$$((x'<<1)>>\text{shift}), wTL=0.$$

Figure 4B:
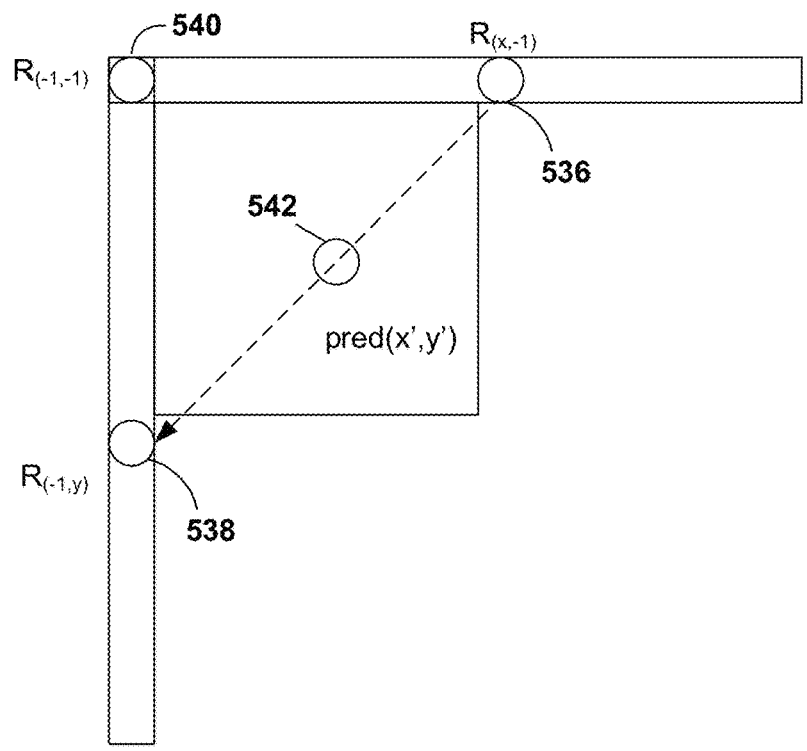

Similarly, FIG. 4B illustrates the definition of reference samples $R_{x,-1}$ 536, $R_{-1,y}$ 538 and $R_{-1,-1}$ 540 for the extension of PDPC to the bottom-left diagonal mode. The prediction sample pred(x', y') 542 is located at (x', y') within the prediction block. The coordinate x of the reference sample $R_{x,-1}$ 536 is given by: x=x'+y'+1, and the coordinate y of the reference sample $R_{-1,y}$ 538 is: y=x'+y'+1.

The PDPC weights for the top-right diagonal mode may be, for example:

$$wT=16>>((y'<<1)>>\text{shift}), wL=16>>$$
$$((x'<<1)>>\text{shift}), wTL=0.$$

Figure 4C:
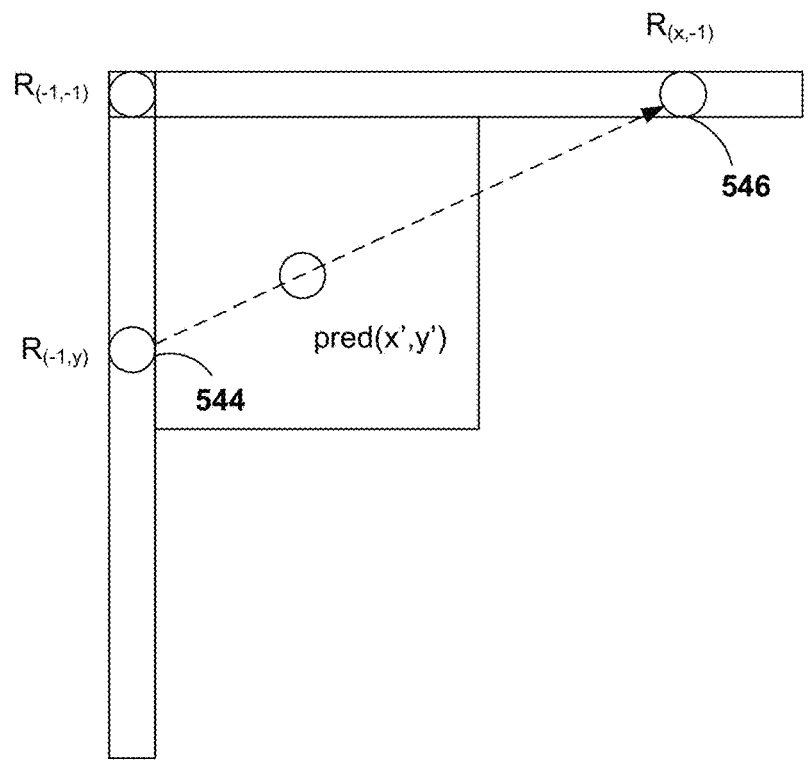

The case of an adjacent top-right diagonal mode is illustrated in FIG. 4C. In general, for the angle α defined and depicted in FIG. 3, they coordinate of the reference sample $R_{-1,y}$ 544 may be determined as follows:

$$y=y'+\tan(\alpha)\times(x'+1),$$

and the x coordinate of $R_{x,-1}$ 546 is given by:

$$x=x'+co\ \tan(\alpha)\times(y'+1),$$

with tan(α) and cotan(α) being the tangent and cotangent of the angle α, respectively. The PDPC weights for an adjacent top-right diagonal mode may be, for example:

$$wT=32>>((y'<<1)>>\text{shift}), wL=32>>$$
$$((x'<<1)>>\text{shift}), wTL=0, \text{or}$$

$$wT=32>>((y'<<1)>>\text{shift}), wL=0, wTL=0.$$

Figure 4D:
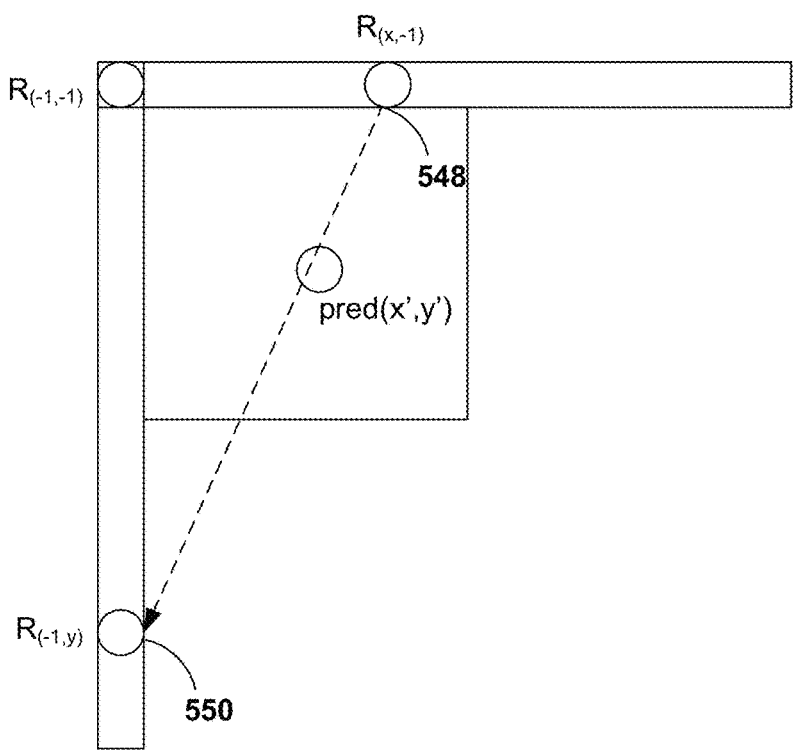

Similarly, the case of an adjacent bottom-left diagonal mode is illustrated in FIG. 4D. In general, for the angle β defined and depicted in FIG. 3, the x coordinate of the reference sample $R_{x,-1}$ 548 is determined as follows:

$$x=x'+\tan(\beta)\times(y'+1),$$

and they coordinate of $R_{-1,y}$ 550 is given by:

$$y=y'+co\ \tan(\beta)\times(x'+1),$$

with tan(β) and cotan(β) the tangent and cotangent of the angle β, respectively. The PDPC weights for an adjacent bottom-left diagonal mode are, for example:

$$wL=32>>((x'<<1)>>\text{shift}), wT=32>>$$
$$((y'<<1)>>\text{shift}), wTL=0, \text{or}$$

$$wL=32>>((x'<<1)>>\text{shift}), wT=0, wTL=0.$$

As is the case for DC, planar, horizontal and vertical mode PDPC, there is no additional boundary filtering, for example specified in J. Chen, E. Alshina, G. J. Sullivan, J.-R. Ohm, J. Boyce, "Algorithm description of Joint Exploration Test Model 7," 7$^{th}$ JVET Meeting, Torino, Italy, July 2017, JVET-G1001, for diagonal and adjacent diagonal modes when PDPC is extended to these modes. In other words, when video encoder 200 and video decoder 300 extend PDPC to diagonal and adjacent diagonal modes, video encoder 200 and video decoder 300 do not perform additional boundary filtering.

VVC WD4 has 95 intra modes defined: 93 angular modes and 2 non-angular modes (namely, Planar and DC). For a given luma coding block, however, video encoder 200 and video decoder 300 may only use 67 modes. The mode that is used for intra mode coding of luma is signaled in the bitstream. In other words, video encoder 200 may signal the intra mode that video encoder 200 uses for intra mode coding of luma and video decoder 300 may determine the signaled intra mode by reading the signal. For efficient signaling of intra modes, a list of most probable modes (MPM list) may be specified. When the intra mode used for a block is present in the MPM list, video encoder 200 may encode the corresponding index to the entry in the list using truncated unary coding. When the intra mode used is a non-MPM mode (when applicable), video encoder 200 may encode the intra mode with a truncated binary codeword.

Three MPM derivations were defined in VVC WD4 for intra prediction of luma coding blocks in I tile (intra tile) groups. One MPM derivation each was specified for the following cases:

MPM-C: When a coding unit is coded (by video encoder 200 and/or video decoder 300, for example) with intra sub-partitions, six entries may be defined in the MPM list for indicating the intra mode used for coding; no non-MPM modes may be used. The MPM list may not include the DC mode.

MPM-B: When a coding unit is coded (by video encoder 200 and/or video decoder 300, for example) with reference samples belonging to a reference line with MRLIdx>0, six entries may be defined in the MPM list for indicating the intra mode used for coding; no non-MPM modes may be used. The MPM list may not include the Planar and the DC modes.

MPM-A: When coding unit is coded (by video encoder 200 and/or video decoder 300, for example) without intra sub-partitions and uses reference sample line with MRLIdx=0 (this is the regular intra mode coding for luma samples), six entries may be defined in the MPM list for indicating the intra mode used for coding; and the remaining 61 non-MPM modes may not be used.

The syntax structure of the mode signaling the luma intra mode is marked off with tags<!> . . . </!> in the syntax structure below:

| | Descriptor |
|---|---|
| coding_unit( x0, y0, cbWidth, cbHeight, treeType ) { | |
|   if( tile_group_type != I ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 ) | |
|       pred_mode_flag | ae(v) |
|   } | |
|   if( CuPredMode[ x0 ][ y0 ] = = MODE_INTRA ) { | |
|   ... | |

| | Descriptor |
|---|---|
| if( treeType = = SINGLE_TREE \| \| treeType = = DUAL_TREE_LUMA ) { | |
|   if( ( y0 % CtbSizeY ) > 0 ) | |
|     intra_luma_ref_idx[ x0 ][ y0 ] | ae(v) |
|   if (intra_luma_ref_idx[ x0 ][ y0 ] = = 0 && | |
|     ( cbWidth <= MaxTbSizeY \| \| cbHeight <= MaxTbSizeY ) && | |
|     ( cbWidth * cbHeight > MinTbSizeY * MinTbSizeY )) | |
|     intra_subpartitions_mode_flag[ x0 ][ y0 ] | ae(v) |
|   if( intra_subpartitions_mode_flag[ x0 ][ y0 ] = = 1 && | |
|     cbWidth <= MaxTbSizeY && cbHeight <= MaxTbSizeY ) | |
|     intra_subpartitions_split_flag[ x0 ][ y0 ] | ae(v) |
| <!>  if( intra_luma_ref_idx[ x0 ][ y0 ] = = 0 && | |
|     intra_subpartitions_mode_flag[ x0 ][ y0 ] = = 0 ) | |
|     intra_luma_mpm_flag[ x0 ][ y0 ] | ae(v) |
|   if( intra_luma_mpm_flag[ x0 ][ y0 ] ) | |
|     intra_luma_mpm_idx[ x0 ][ y0 ] | ae(v) |
|   Else | |
|     intra_luma_mpm_remainder[ x0 ][ y0 ] | ae(v)</!> |
| } | |
| if( treeType = = SINGLE_TREE \| \| treeType = = DUAL_TREE_CHROMA ) | |
|   intra_chroma_pred_mode[ x0 ][ y0 ] | ae(v) |
| } | |
| } else if( treeType != DUAL_TREE_CHROMA ) { /* MODE_INTER */ | |

Figure 5:
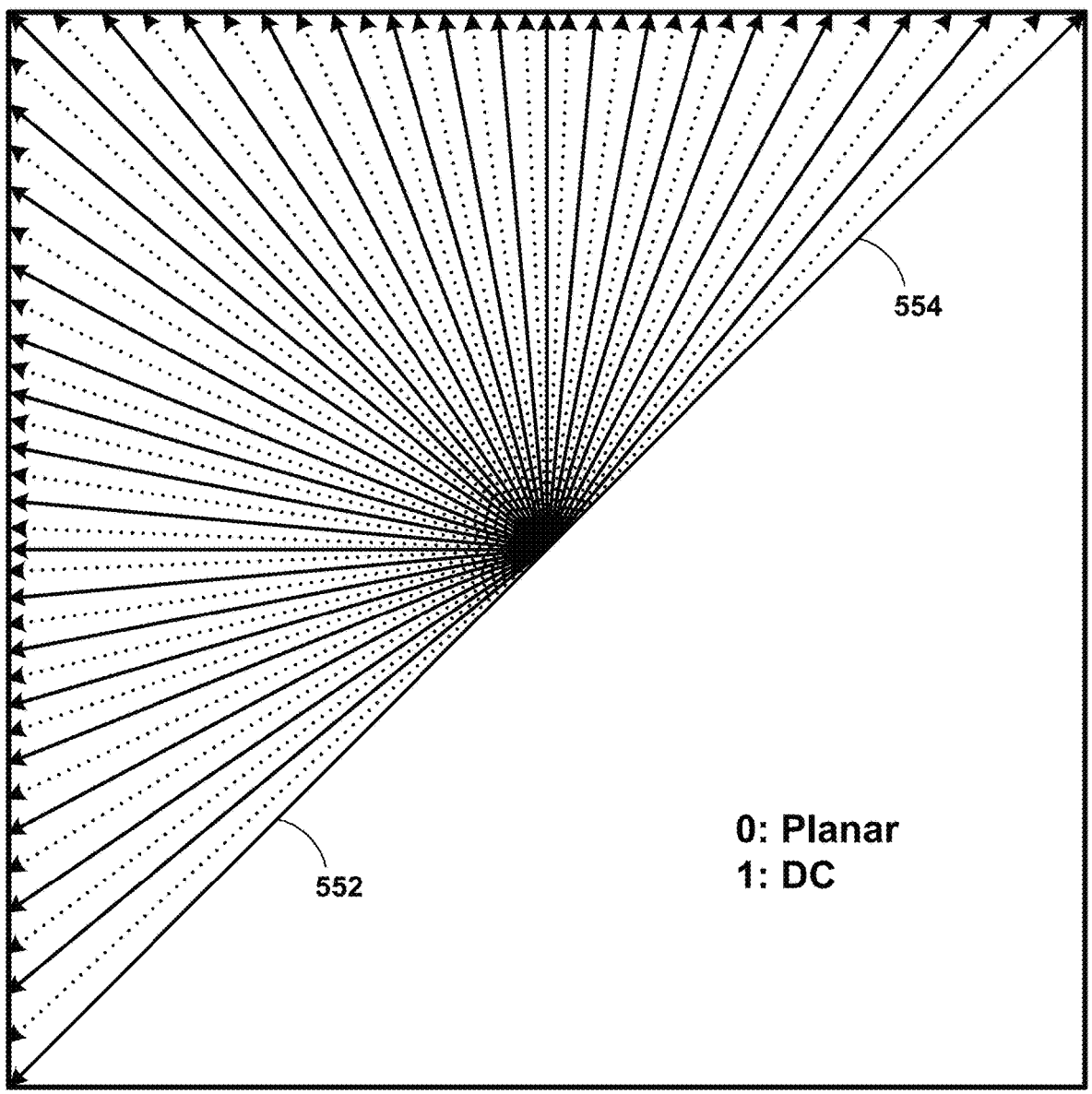
FIG. 5 is a conceptual diagram illustrating example directions of intra prediction in which arrows point towards the reference samples.

Under the MPM list design in VVC WD4 set forth above, video encoder 200 and video decoder 300 may construct 3 lists separately for each of the three cases as indicated in the previous section. Multiple MPM derivation schemes pose unnecessary burden on video encoder 200 and video decoder 300. For each block, depending on the block coding, video encoder 200 and video decoder 300 may need to perform a different MPM derivation. One way to unify MPM-A and MPM-B (as discussed above) was described in F. Bossen, K. Misra, "Non-CE3: A unified luma intra mode list construction process", document no.: JVET-M0528, and J. Yao, J. Zhu, W. Cai, K. Kazui, "Non-CE3: Intra prediction information coding", document no. JVET-M0210. Although some aspects of these two documents differ, a common aspect is the signaling of the Planar and the DC modes separately from the angular modes. A first flag (referred to as non_angular_flag in the rest of the document) is signaled (by video encoder 200) to indicate whether the mode is non-angular (Planar or DC) and a second flag (referred to as planar_dc_flag in the rest of the document) is signaled (by video encoder 200) to indicate which mode among Planar and DC is used. These flags are context coded by video encoder 200. An example of the signaling is provided below:

non_angular_flag
  if (non_angular_flag)
    planar_dc_flag//one value indicates Planar, other value DC FIG. 5 is a conceptual diagram illustrating example directions of intra prediction in which arrows point towards the reference samples. Intra prediction involves DC prediction mode, Planar prediction mode and directional (or angular) prediction mode. For directional prediction for square blocks, video encoder 200 and video decoder 300 may use directions between −135 degrees 552 to 45 degrees 554 of the current block according to the VVC test model 2 (VTM2) (J. Chen, Y. Ye, S. Kim, "Algorithm description for Versatile Video Coding and Test Model 2 (VTM2)," 11th JVET Meeting, Ljubljana, SI, July 2018, JVET-K1002), as illustrated in FIG. 5.

In VTM2, the block structure used for specifying the prediction block for intra prediction is not restricted to being square (width w=height h). Rectangular or non-square prediction blocks (w>h or w<h) may be used and may increase the coding efficiency based on the characteristics of the content.

Figure 6:
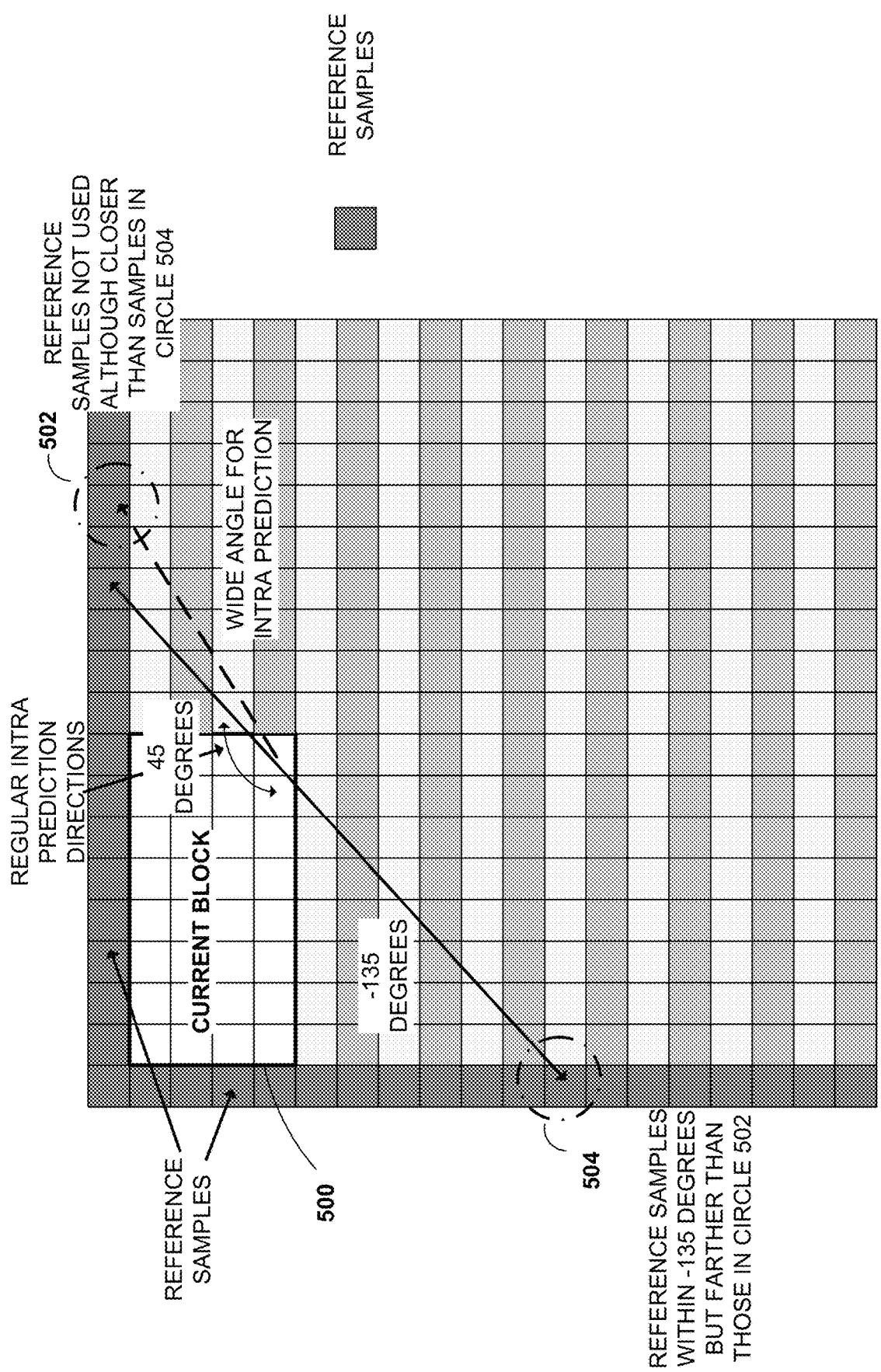
FIG. 6 is a conceptual diagram of an example of an 8×4 rectangular block where closer reference samples are not used, but farther reference samples may be used.

In such rectangular blocks, restricting the direction of intra prediction to be within −135 degrees to 45 degrees can result in situations where farther reference samples are used rather than closer reference samples for intra prediction. Such a design may have an impact on the coding efficiency. It may be beneficial to have the range of restrictions relaxed so that closer reference samples (beyond the −135 to 45-degree angle) may be used for prediction. An example of such a case is given in FIG. 6. FIG. 6 is a conceptual diagram of an example of 8×4 rectangular block 500 where closer reference samples, such as reference sample 502 are not used, but farther reference samples, such as reference sample 504, may be used, due to restriction of intra prediction direction to be in the range −135 degrees to 45 degrees. In other words, if video encoder 200 and video decoder 300 are restricted to using intra prediction angles between −135 degrees and 45 degrees, then video encoder 200 and video decoder 300 may use a reference sample that is further away from rectangular block 500 than video encoder 200 and video decoder 300 may otherwise use. Using a block that is further away from the current block may result in less accurate motion prediction.

Figure 7:
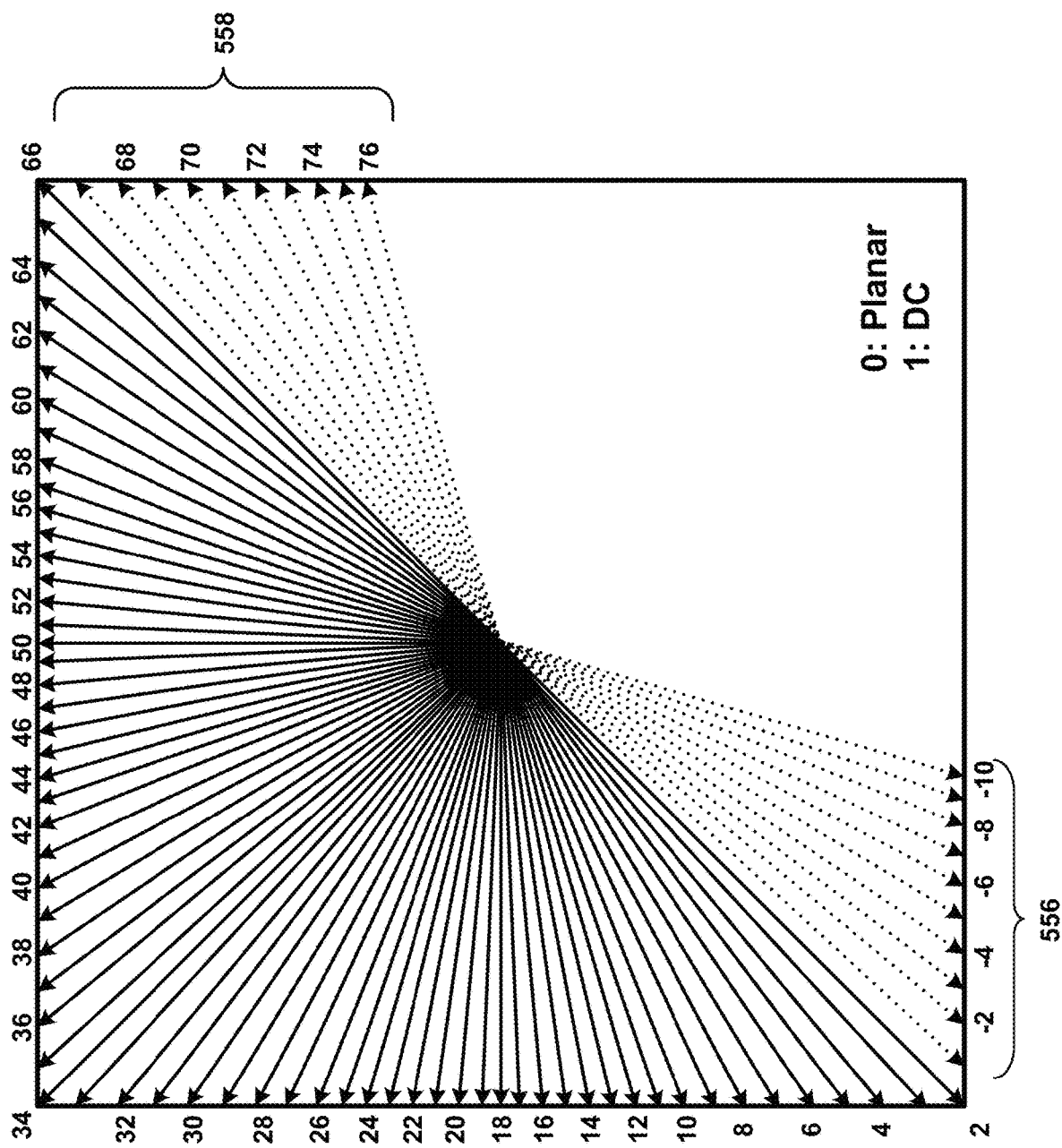
FIG. 7 is a conceptual diagram in which wide angles (−1 to −10, and 67 to 76) are depicted in addition to the 65 angular modes.

FIG. 7 is an illustration of wide angles that are adopted in VTM2. In other words, FIG. 7 is a conceptual diagram in which wide angles 556 and 558 (−1 to −10, and 67 to 76, respectively) are depicted in addition to the 65 angular modes between −135 degrees and 45 degrees.

Figure 8A:
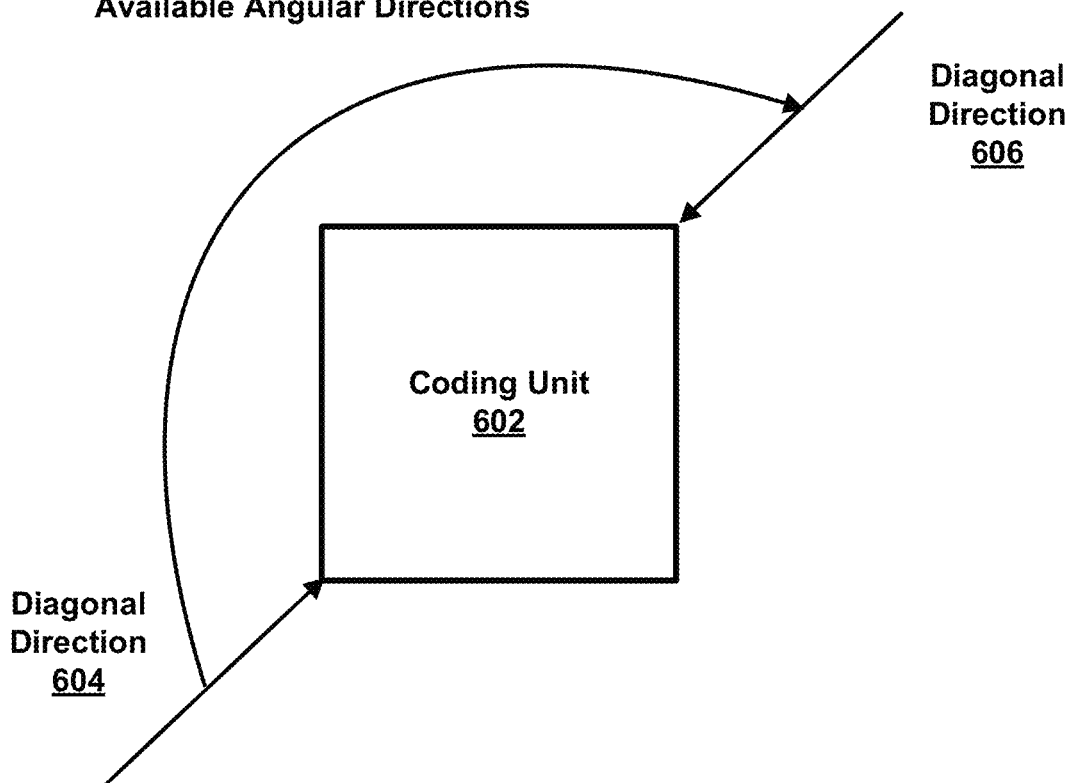
FIGS. 8A, 8B, and 8C are conceptual diagrams illustrating mode mapping processes for modes outside the diagonal direction range.
Figure 8B:
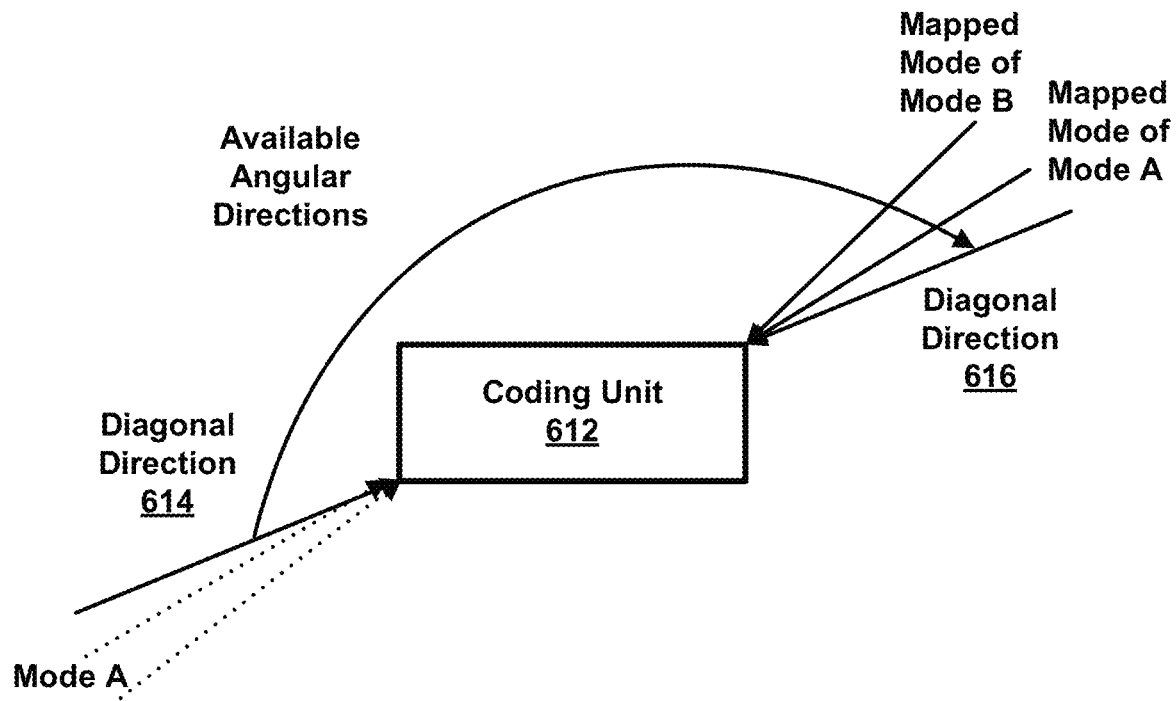
Figure 8C:
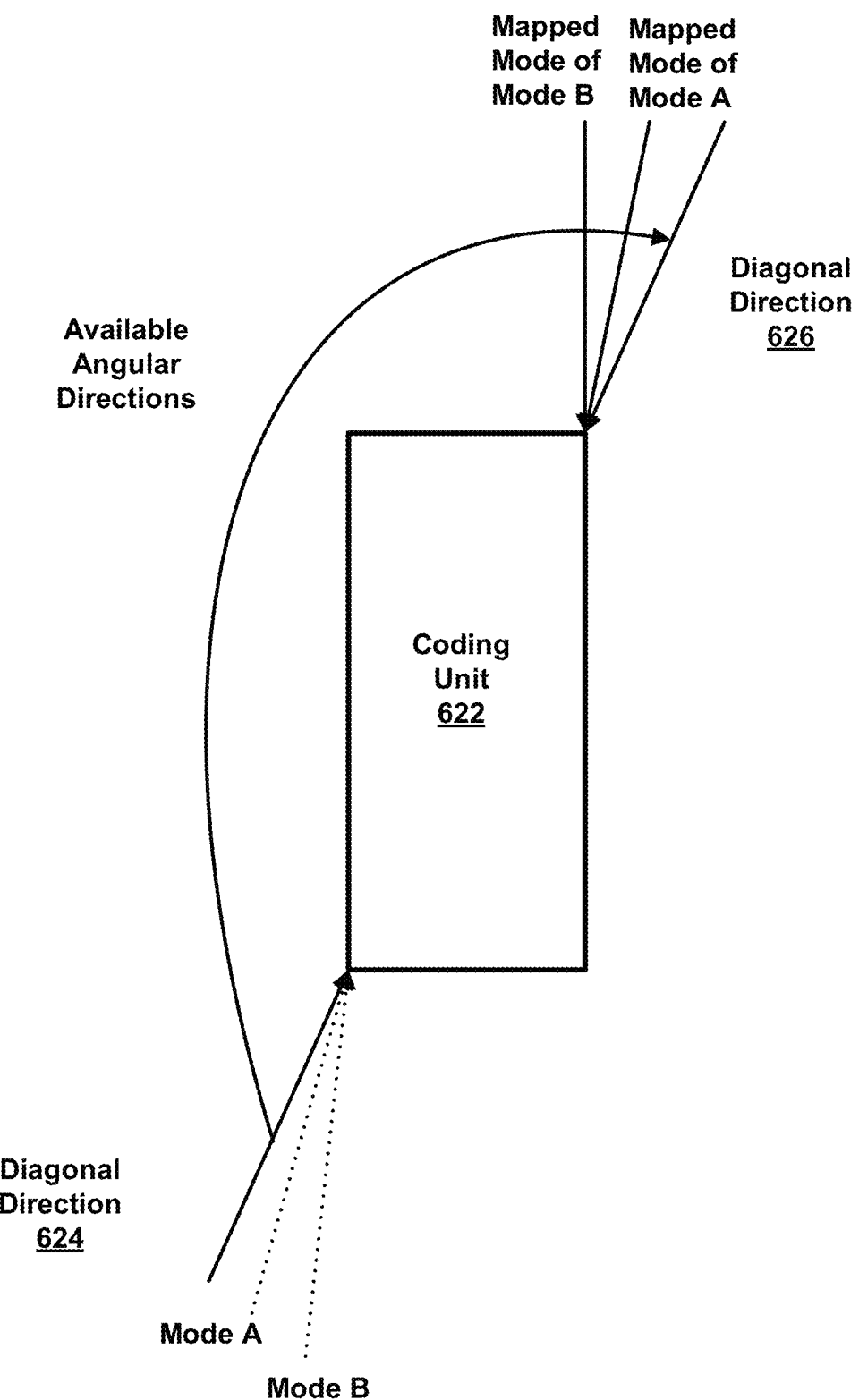

During the 12th JVET meeting, a modification of wide-angle intra prediction was adopted into VTM3 (L. Zhao, X. Zhao, S. Liu, X. Li, "CE3-related: Unification of angular intra prediction for square and non-square blocks," 12th JVET Meeting, Macau SAR, CN, October 2018, JVET-L0279; J. Chen, Y. Ye, S. Kim, "Algorithm description for Versatile Video Coding and Test Model 3 (VTM3)," 12th JVET Meeting, Macau SAR, CN, October 2018, JVET-L1002; B. Bross, J. Chen, S. Liu, "Versatile Video Coding (Draft 3)," 12th JVET Meeting, Macau SAR, CN, October 2018, JVET-L1001). The adoption includes two modifications to unify the angular intra prediction for square and non-square blocks. Firstly, angular prediction directions are modified to cover diagonal directions of all block shapes. Secondly, all angular directions are kept within the range between the bottom-left diagonal direction and the top-right diagonal direction for all block aspect ratios (square and non-square) as illustrated in FIGS. 8A-8C. In addition, the number of reference samples in the top reference row and left reference column are restricted to 2*width+1 and 2*height+1 for all block shapes. FIG. 8A depicts an example square block CU 602 that does not require angular mode remapping. In other words, the diagonal modes of bottom-left diagonal direction 606 and top-right diagonal direction 604 are a 45-degree mode and a −135-degree mode which are available modes as depicted in FIG. 5. Video encoder 200 and video decoder 300 may select among the available angular directions between bottom-left diagonal direction 606 and top-right diagonal direction 604 as depicted and none of these modes would require angular mode remapping, as they are all within −135 degrees and 45 degrees. FIG. 8B depicts an example horizontal non-square block CU 612 which may involve angular mode remapping. In other words, bottom-left diagonal direction 616 and top-right diagonal direction 614 are outside of the −135-degree and 45-degree modes depicted in FIG. 5. Video encoder 200 and video decoder 300 may select among the available angular directions between bottom-left diagonal direction 616 and top-right diagonal direction 614 as depicted, some of which may require angular mode remapping to wide angle modes. FIG. 8C depicts an example vertical non-square block CU 622 which may involve angular mode remapping. In other words, bottom-left diagonal direction 626 and top-right diagonal direction 624 are outside of the −135-degree and 45-degree modes depicted in FIG. 5. Video encoder 200 and video decoder 300 may select among the available angular directions between bottom-left diagonal direction 626 and top-right diagonal direction 624 as depicted, some of which may require angular mode remapping to wide angle modes.

Figure 9:
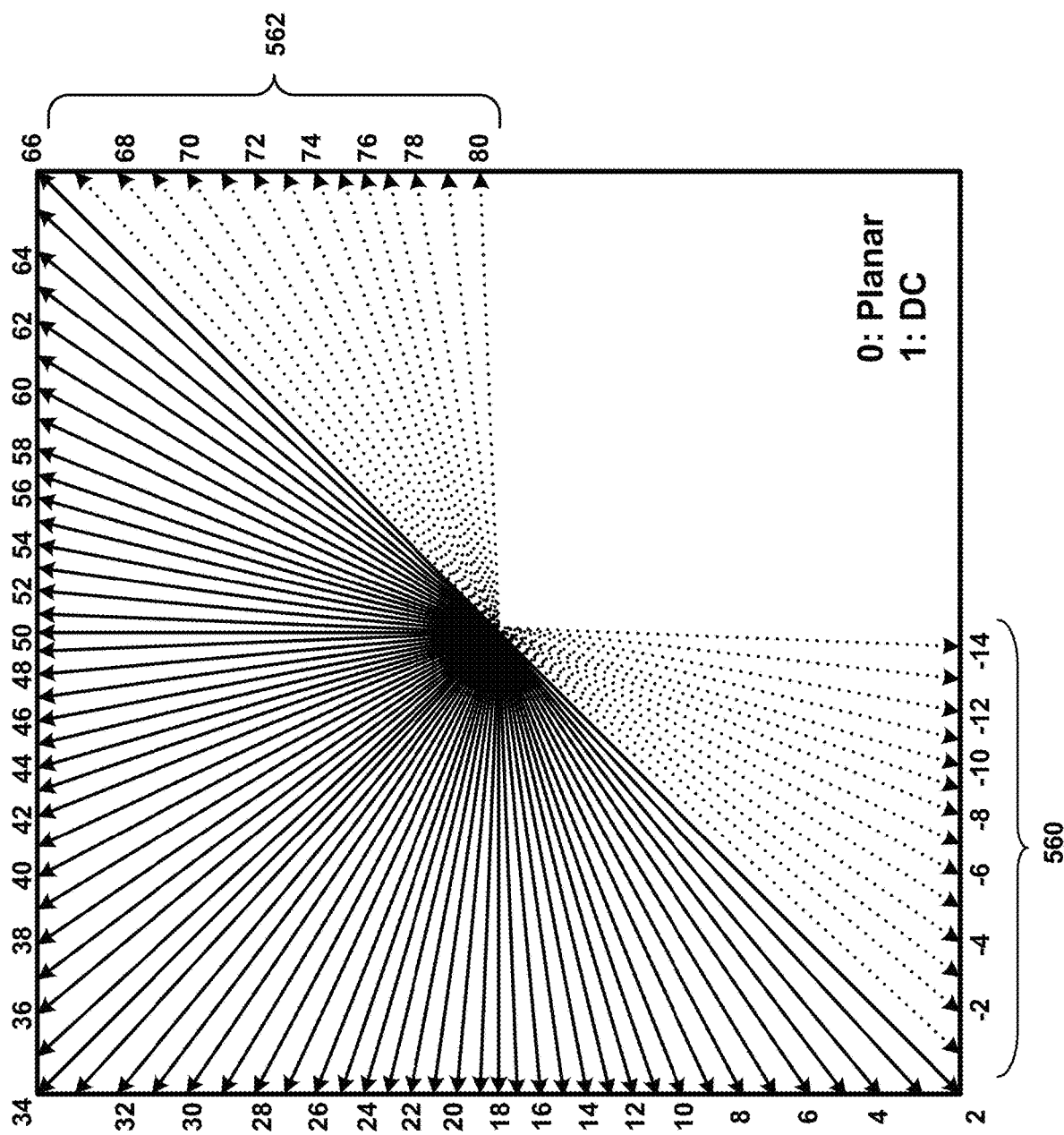
FIG. 9 is a conceptual diagram illustrating wide angles (−1 to −14, and 67 to 80) beyond modes 2 and 66 for a total of 93 angular modes in Test Model 3 (VTM3) of Versatile Video Coding.

An illustration of wider angles that are adopted in VTM3 is provided in FIG. 9. FIG. 9 is a conceptual diagram illustrating wide angles 560 and 562 (−1 to −14, and 67 to 80, respectively) in VTM3 beyond modes 2 and 66 for a total of 93 angular modes. Although VTM3 defines 95 modes, for any block size only 67 modes are allowed according to VTM3. The exact modes that are allowed depends on the ratio of block width to height. This is done by restricting the mode range for certain blocks sizes. In other words, video encoder 200 and video decoder 300 may be restricted according to VTM3 to using certain modes for a given block based on the ratio of block width to height.

FIG. 10 specifies a mapping table 564 between predModeIntra and the angle parameter intraPredAngle in VTM3 (B. Bross, J. Chen, S. Liu, "Versatile Video Coding (Draft 3)," 12th JVET Meeting, Macau SAR, CN, October 2018, JVET-L1001). In the following, angular modes with a positive intraPredAngle value are referred to as positive angular modes (mode index<18 or >50), while angular modes with a negative intraPredAngle value are referred to as negative angular modes (mode index>18 and <50).

In FIG. 10, angular modes corresponding with non-square block diagonals are underlined. Horizontal and vertical modes are double underlined. Square block diagonal modes are indicated by asterisks (*.*).

The inverse angle parameter invAngle is derived based on intraPredAngle as follows:

$$invAngle = \text{Round}\left(\frac{256*32}{intraPredAngle}\right) \quad (1\text{-}1)$$

Note that intraPredAngle values that are multiples of 32 (0, 32, 64, 128, 256, 512) correspond with prediction from non-fractional reference array samples, as is the case in the VTM3 specification.

TABLE 1

Diagonal modes corresponding with various example block aspect ratios.

| Block aspect ratio (width/height) | Diagonal modes |
|---|---|
| 1 (square) | 2, 34, 66 |
| 2 | 8, 28, 72 |
| 4 | 12, 24, 76 |
| 8 | 14, 22, 78 |
| 16 | 16, 20, 80 |
| 1/2 | −6, 40, 60 |
| 1/4 | −10, 44, 56 |
| 1/8 | −12, 46, 54 |
| 1/16 | −14, 48, 52 |

In HEVC, before intra prediction, the neighboring reference samples are potentially filtered using a 2-tap linear or 3-tap (1,2,1)/4 filter. In other words, video encoder 200 and video decoder 300 may filter neighboring reference samples using a 2-tap linear or 3-tap (1,2,1)/4 filter. This process is known as intra reference smoothing or mode-dependent intra smoothing (MDIS). In MDIS, given the intra prediction mode index predModeIntra and block size nTbS, it is decided whether the reference smoothing process is performed and if so which smoothing filter is used. In other words, video encoder 200 and video decoder may determine whether to use reference smoothing and which smoothing filter to use based on the intra prediction mode index predModeIntra and block size nTbS. The following text is the related paragraph from the HEVC specification regarding smoothing:

"8.4.4.2.3 Filtering process of neighboring samples
Inputs to this process are:
the neighboring samples p[x][y], with x=−1, y=−1 . . . nTbS*2−1 and x=0 . . . nTbS*2−1, y=−1,
a variable nTbS specifying the transform block size.
    Outputs of this process are the filtered samples pF[x][y], with x=−1, y=−1 . . . nTbS*2−1 and x=0 . . . nTbS*2−1, y=−1.
    The variable filterFlag is derived as follows:
If one or more of the following conditions are true, filterFlag is set equal to 0:
    predModeIntra is equal to INTRA_DC.
    nTbS is equal 4.
Otherwise, the following applies:
    The variable minDistVerHor is set equal to Min(Abs (predModeIntra—26), Abs(predModeIntra—10)).
The variable intraHorVerDistThres[nTbS] is specified in Table 8-3.
The variable filterFlag is derived as follows:
    If minDistVerHor is greater than intraHorVerDistThres [nTbS], filterFlag is set equal to 1.
    Otherwise, filterFlag is set equal to 0.

TABLE 8-3

Specification of intraHorVerDistThres [nTbS] for various transform block sizes

| | nTbS = 8 | nTbS = 16 | nTbS = 32 |
|---|---|---|---|
| intraHorVerDistThres [nTbS] | 7 | 1 | 0 |

When filterFlag is equal to 1, the following applies:
The variable biIntFlag is derived as follows:
  If all of the following conditions are true, biIntFlag is set equal to 1:
    strong_intrasmoothing_enabled_flag is equal to 1
    nTbS is equal to 32
    Abs(p[−1][−1]+p[nTbS*2−1][−1]−2*p[nTbS−1][−1])<(1<<(BitDepthy−5))
    Abs(p[−1][−1]+p[−1][nTbS*2−1]−2*p[−1][nTbS−1])<(1<<(BitDepthy−5))
  Otherwise, biIntFlag is set equal to 0.
The filtering is performed as follows:
  If biIntFlag is equal to 1, the filtered sample values pF[x][y] with x=−1, y=−1 . . . 63 and x=. . . 63, y=−1 are derived as follows:
    pF[−1][−1]=p[−1][−1]
    pF[−1][y]=((63−y)*p[−1][−1]+(y+1)*p[−1][63]+32)>>6 for y=. . . 62 (8-31)
    pF[−1][63]=p[−1][63]
    pF[x][−1]=((63−x)*p[−1][−1]+(x+1)*p[63][−1]+32)>>6 for x=. . . 62 (8-33)
    pF[63][−1]=p[63][−1]
  Otherwise (biIntFlag is equal to 0), the filtered sample values pF[x][y] with x=−1, y=−1 . . . nTbS*2−1 and x=0 . . . nTbS*2−1, y=−1 are derived as follows:
    pF[−1][−1]=(p[−1][0]+2*p[−1][−1]+p[0][−1]+2)>>2
    PF[−1][y]=(p[−1][y+1]+2*p[−1][y]+p[−1][y−1]+2)>>2 for y=0 . . . nTbS*2−2
    pF[−1][nTbS*2−1]=p[−1][nTbS*2−1]
    pF[x][−1]=(p[x−1][−1]+2*p[x][−1]+p[x+1][−1]+2)>>2 for x=0 . . . nTbS*2−2
    pF[nTbS*2−1][−1]=p[nTbS*2−1][−1](8-39)"

During the Joint Video Exploration Team (JVET) activities, the Joint Exploration Test Model (JEM) version 7 (J. Chen, E. Alshina, G. J. Sullivan, J.-R. Ohm, J. Boyce, "Algorithm description of Joint Exploration Test Model 7," 7th JVET Meeting, Torino, Italy, July 2017, JVET-G1001) (hereinafter, "JEM7") was defined and the following version of the MDIS table was included for luma blocks:

| sizeIndex | Threshold[sizeIndex] |
| --- | --- |
| 0 | 20 |
| 1 | 20 |
| 2 | 14 |
| 3 | 2 |
| 4 | 0 |
| 5 | 20 |
| 6 | 0 |

The block size index is defined as follows in JEM7:

sizeIndex=(log 2(BlockWidth)−2+log 2(BlockHeight)−2)/2+2−1

Whether to apply the [1 2 1]/4 smoothing filter to the intra reference samples is determined as follows:

IntraModeDiff=min(abs(IntraModeIdx−$HOR\_IDX$), abs(IntraModeIdx−$VER\_IDX$))

with HOR_IDX=18 and VER_IDX=50, because JEM7 has 65 directional intra modes (IntraModeIdx 2-66) in addition to planar (IntraModeIdx=0) and DC (IntraModeIdx=1) modes. The following condition determines whether to apply the smoothing filter:

IF IntraModeDiff>Threshold[sizeIndex]THEN "apply smoothing filter"

In the Joint Video Experts Team (JVET) and its VVC Test Model version 3 (VTM3) (B. Bross, J. Chen, S. Liu, "Versatile Video Coding (Draft 3)," 12th JVET Meeting, Macau SAR, CN, October 2018, JVET-L1001), the following MDIS table is included:

| sizeIndex | Threshold[sizeIndex] |
| --- | --- |
| 0 | 20 |
| 1 | 20 |
| 2 | 20 |
| 3 | 14 |
| 4 | 2 |
| 5 | 0 |
| 6 | 0 |
| 7 | 0 |

The block size index is defined as follows in VTM3:

sizeIndex=(log 2(BlockWidth)+log 2(BlockHeight))/2

Whether to apply the [1 2 1]/4 smoothing filter to the non-fractional intra reference samples or switch the interpolation filters between smoothing (e.g., Gaussian interpolation) and non-smoothing (e.g., cubic interpolation) for fractional reference sample positions is determined as follows:

IntraModeDiff=min(abs(IntraModeIdx−$HOR\_IDX$), abs(IntraModeIdx−$VER\_IDX$))

with HOR_IDX=18 and VER_IDX=50 and the condition:

IF IntraModeDiff>Threshold[sizeIndex]THEN "apply smoothing"

In VTM3, for wide-angle modes with index<2 or >66, the intra smoothing condition is set equal to true. The reason that the intra smoothing is set equal to true is that two vertically adjacent predicted samples may use two non-adjacent reference samples in the case of wide-angle intra prediction.

Figure 11:
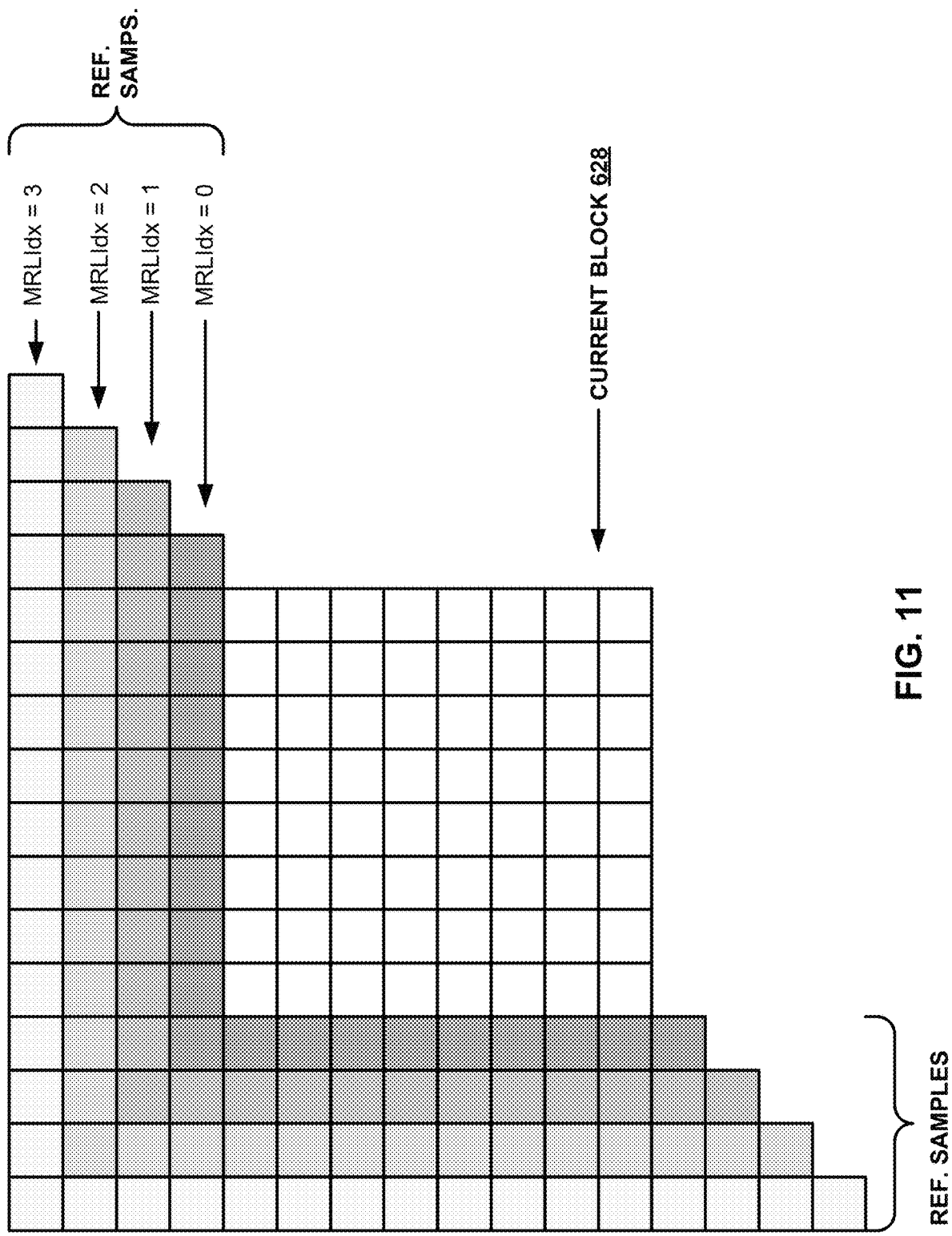
FIG. 11 is a conceptual diagram illustrating reference samples from multiple reference lines that may be used for intra prediction of the coding block.

The samples in the neighborhood of a coding block are used for intra prediction of the block. For example, video encoder 200 and video decoder 300 may use samples that neighbor a current block for intra prediction of the current block. Typically, the reconstructed reference sample lines that are closest to the left and the top boundaries of the coding block are used as the reference samples for intra prediction. However, VVC WD4 also enables other samples in the neighborhood of the coding block to be used as reference samples. FIG. 11 illustrates reference samples that may be used for intra prediction. FIG. 11 is a conceptual diagram illustrating reference samples from multiple reference lines that may be used for intra prediction of the coding block. For each coding block, an index is signaled that indicates the reference line that is used.

In VVC WD4, only reference lines with MRLIdx equal to 0, 1 and 3 may be used. The index to the reference line used for coding the block (values 0, 1 and 2 indicating lines with MRLIdx 0, 1 and 3, respectively) may be coded with a truncated unary codeword. Planar and DC modes may not be used for the reference line used has MRLIdx>0. In some examples, only reference lines with MRLIdx equal to 0, 1 and 2 may be used and the index to the reference line for coding the block may used values 0, 1 and 2 to indicate lines with MRLIdx of 0, 1 and 2, respectively.

Intra mode coding in VVC has several modes for prediction. These modes may be split into two sets: angular modes and non-angular modes. Angular modes (also referred to as directional modes) describe a linear model to derive the position of the reference samples associated with a sample to be predicted. Non-angular modes currently include Planar and DC modes.

Angular modes are used in blocks that may be easily predicted by a linear model; these blocks may contain edges that are straight (horizontal, vertical, slanted, etc.). For example, video encoder 200 and video decoder 300 may use an angular intra mode to predict blocks with straight edges. The prediction of these features using angular modes results in reduced energy in the residual content, which may be efficiently compressed with fewer bits. FIG. 12 is a conceptual diagram illustrating angular intra prediction that can predict structures with straight edges. Particularly, FIG. 12 shows two examples 566 and 568 of angular mode prediction with linear prediction mode. In other words, two examples of angular mode prediction are presented. In planar mode, video encoder 200 and/or video decoder 300 makes a prediction based on a model that the prediction block is smoothly varying compared to its neighboring reference samples. In DC mode, video encoder 200 and/or video decoder assumes a flat prediction model for the current block. Filtering and PDPC only smoothen the boundary differences of the prediction block and neighboring samples and do not necessarily capture new prediction shapes. Content in video often contains features that are not well predicted by the modes described above, e.g., curved edges, etc. In the absence of modes specifically for such shapes, codecs (e.g., video encoder 200 and video decoder 300) typically split the region of the object into smaller blocks that may be predicted with the existing modes. Splitting blocks involves signaling which may result in lower compression efficiency.

The following section of this disclosure discloses several example techniques to improve intra prediction. These example techniques may improve compression efficiency. One or more examples disclosed in this section may be applied independently, or in combination.

In one example, for each sample s(x, y) in a block,
with (x, y) indicating the position of the sample s relative to the top-left sample of the block,
where, W and H are the width and height of the block, respectively,
where x is in the range of 0 to W−1, inclusive, and y is in the range of 0 to H−1, inclusive,
deriving a reference sample position (RSP), (xR, yR) where xR and yR are coordinates relative to the top-left sample of the block,
deriving a reference sample value sR at position (xR, yR),
using the reference sample value sR to derive a predicted value, $s_{pred}(x,y)$ for sample s, and
coding a syntax element to indicate the method used for deriving the RSP.

In some examples, video encoder 200 may signal the syntax element in a bitstream that comprises an encoded representation of the video data. For example, video encoder 200 may signal a syntax element that is indicative of the method used by video encoder 200 to derive the RSP. In some examples, video decoder 300 may obtain the signaled syntax element from the bitstream. For example, video decoder 300 may obtain a syntax element signaled by video encoder 200 that is indicative of the method used by video encoder 200 to derive the RSP. In this manner, video decoder 300 may read the syntax element to determine the syntax element and thereby, the method used by video encoder 200 to derive the RSP. Based on the indication of the method used by video encoder 200 to derive the RSP, video decoder may employ the same method to derive the RSP.

In some examples, the RSP (xR, yR) may also be defined so that the coordinates are relative to another sample in the block (e.g., not the top-left sample) or in the neighborhood of the block, or any sample in the picture.

The above steps are written from the point of view of video encoder 200, but video decoder 300 may perform equivalent steps at video decoder 300 (in some cases, video encoder 200 may also have an instance of a video decoder implemented to reconstruct the samples). For example, video decoder 300 which may start with decoding a syntax element that would be used to identify the method for deriving the RSP for the sample location (x, y); subsequently equivalent process is done at video decoder 300 to derive the prediction of the sample value. In other words, after video decoder 300 decodes the syntax element and identifies the method for deriving the RSP for the sample location (x, y), video decoder 300 may derive the prediction of the sample value through an equivalent process to that used by video encoder 200.

In another example, the RSP for a sample s(x,y) may be derived using a single model. The RSP for the sample s(x,y) may be derived based on a model that may depend on the block position (e.g., position of the top-left sample of the block), the block width and height, or other parameters including characteristics of neighboring blocks (including, but not limited to, width, height, intra mode used, intra prediction direction/angle, etc.). The following is a non-exhaustive list of illustrations of models that may be used to derive the RSP.

Figure 13A:
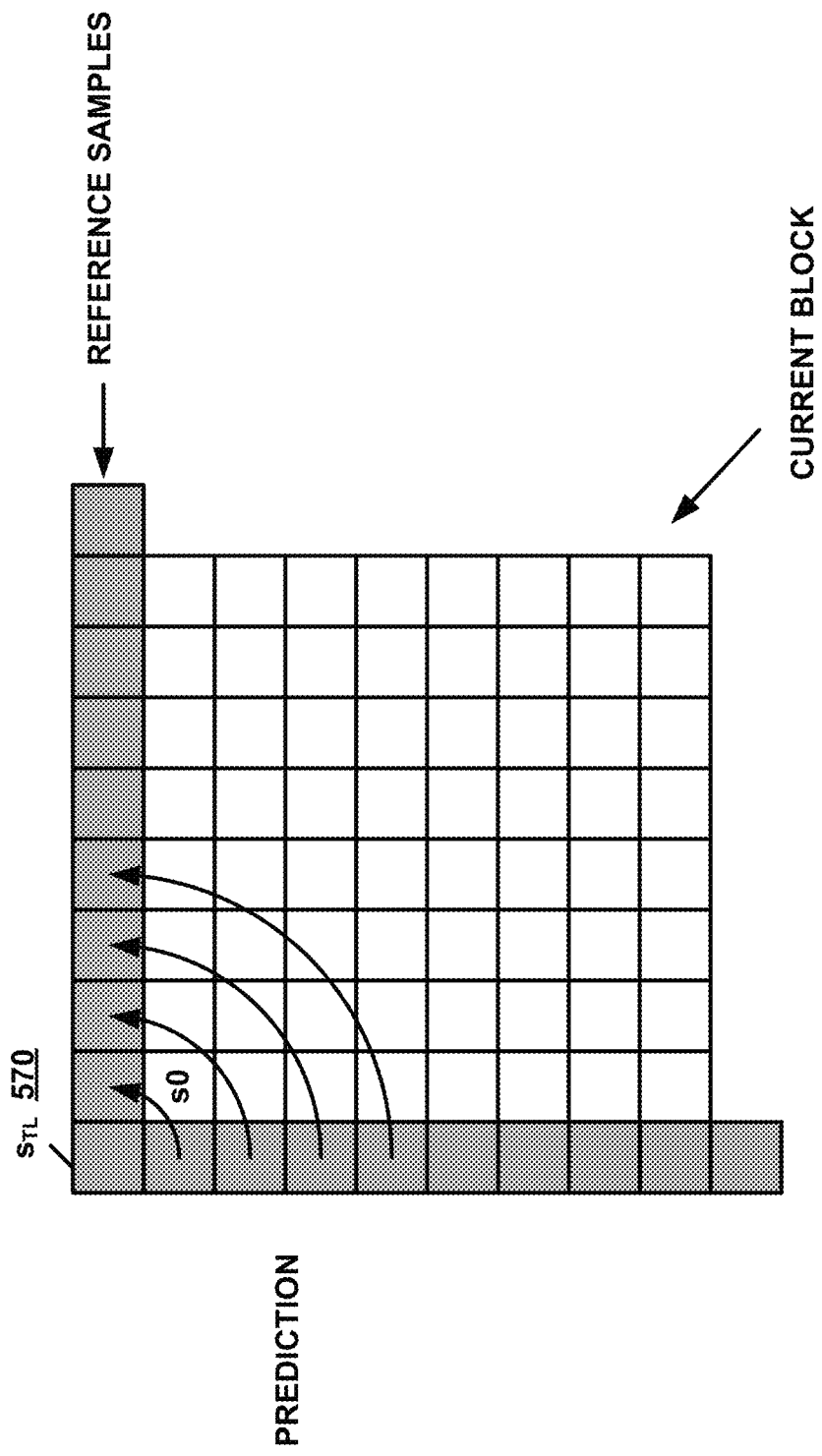
FIG. 13A and FIG. 13B are conceptual diagrams illustrating example circular models for deriving a reference sample position (RSP), with the top-left sample as the center of the circle.
Figure 13B:
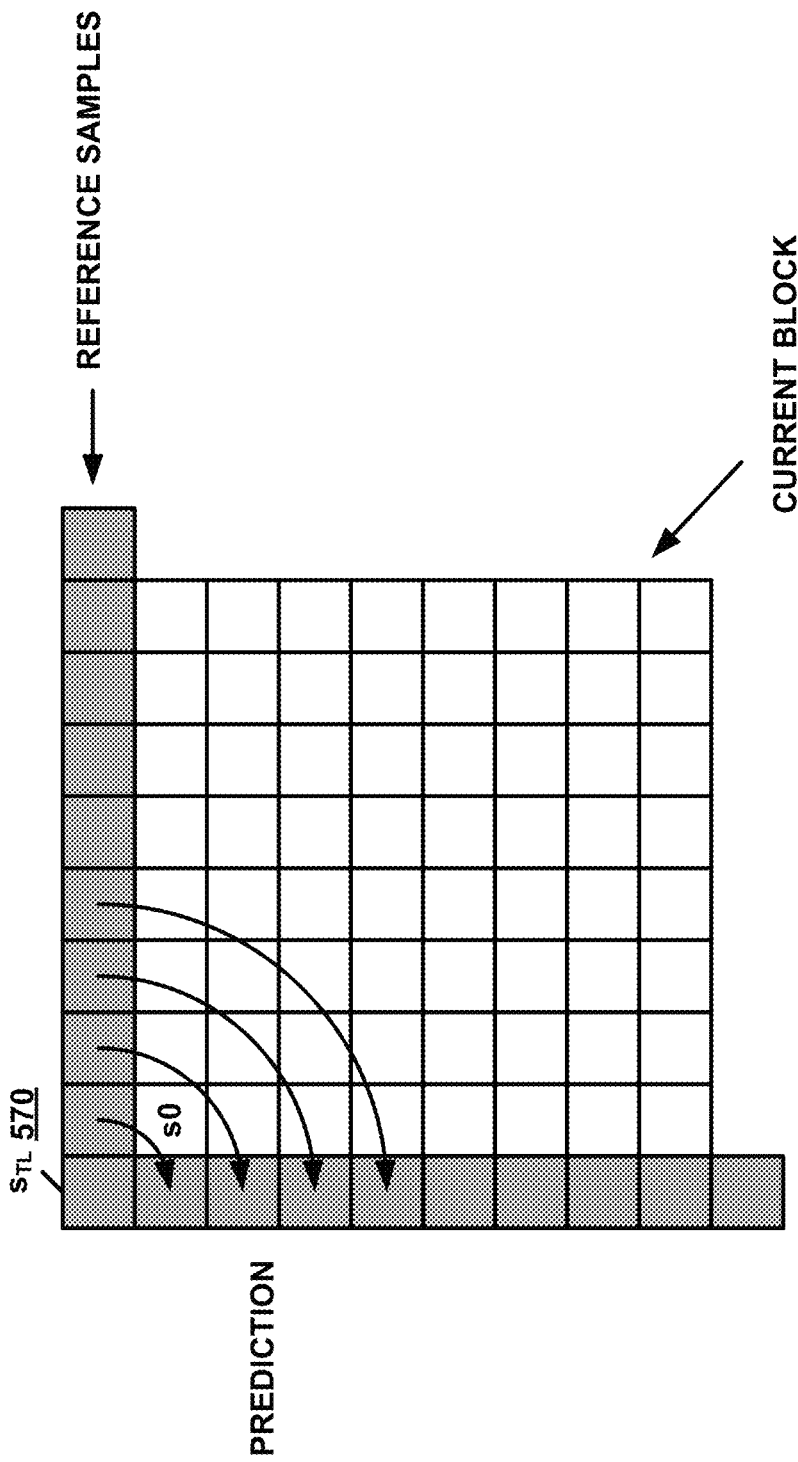

The RSP may be derived using a circular model. For example, video encoder 200 and video decoder 300 may utilize a circular model to determine the RSP. With a circular model, the RSP is obtained by a circular prediction model. Let s0 be the top-left sample of the block; $s_{TL}$ 570 is said to be the sample to the top-left of s0. The circular model has $s_{TL}$ 570 as center of the circle, and a radius is the distance of the predicted sample from $s_{TL}$ 570. FIG. 13A and FIG. 13B show examples of circular model of RSP derivation. That is, FIG. 13A and FIG. 13B are conceptual diagrams illustrating example circular models for deriving reference sample position, with the top-left sample as the center of the circle. A reference sample position that is at the same (or similar) radial distance as (x,y) from $s_{TL}$ 570 is chosen as the RSP. In other words, video encoder 200 and video decoder 300 may chose an RSP such that the reference sample is at the same radial distance as (x,y) from $s_{TL}$ 570. FIG. 13A and FIG. 13B show that the reference sample position may be the top reference samples or right reference samples, respectively. The radius of the sample s(x,y) is given as follows:

$$r=\text{sqrt}((x+1)^2+(y+1)^2)$$

For example, if the top-reference sample is chosen (as in FIG. 13B), the RSP may be chosen as (r, −1) with respect to s0. When the left reference samples are chosen (as in FIG. 13A), the RSP may be chosen as (−1, r) with respect to s0.

Figure 14:
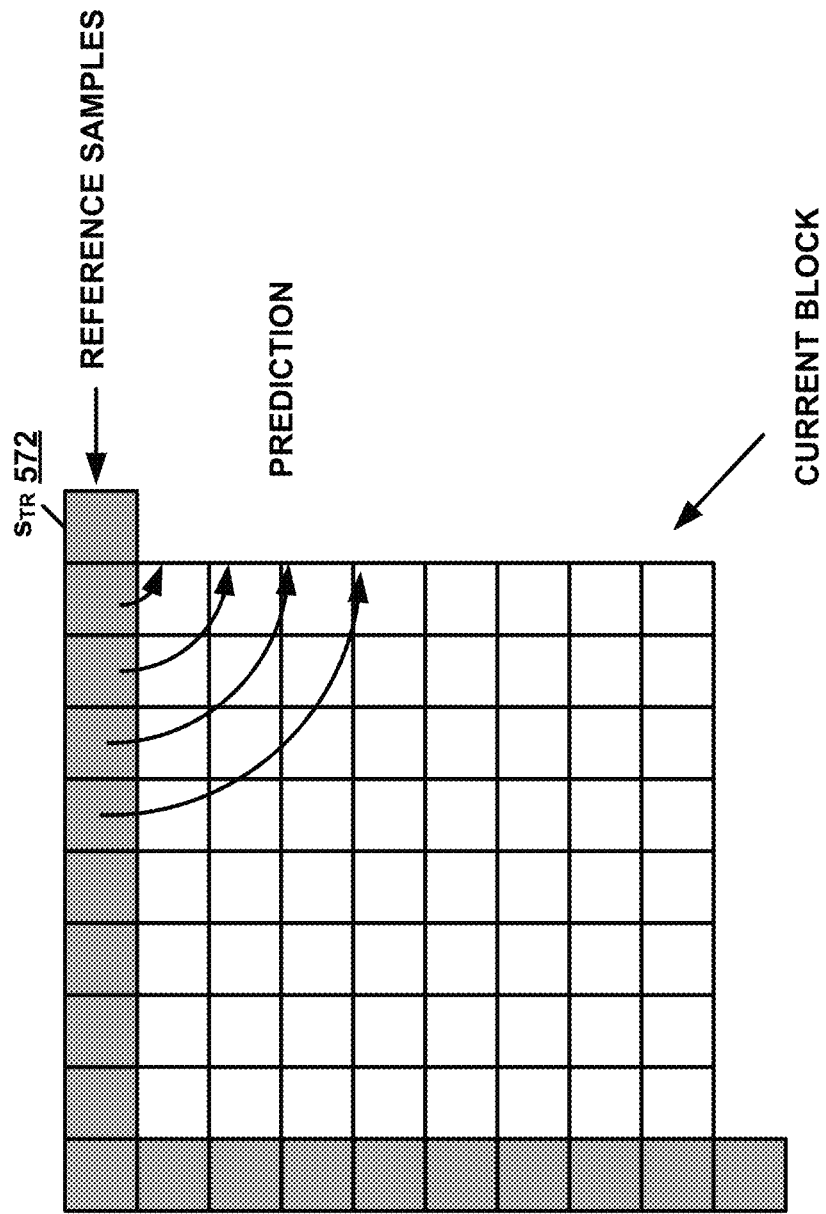
FIG. 14 is a conceptual diagram illustrating an example circular model for deriving an RSP, with the top-right sample as the center of the circle.

The choice of $s_{TL}$ 570 as the center of the circular model for the block was made to illustrate an example. Video encoder 200 and video decoder 300 may choose any other sample position as the center of the circle. A different sample position chosen as the center of the circle may result in a different RSP derivation. For example, a sample to the top-right of the currently block, $s_{TR}$ 572 may be the center of the circle, as shown in FIG. 14. FIG. 14 is a conceptual diagram illustrating an example circular model for deriving reference sample position, with the top-right sample as the center of the circle. Although in some examples the circular model may apply to samples in square blocks, more generally samples in a block that has any shape may use the circular model for RSP derivation.

The RSP may also be derived using an elliptical model. For example, video encoder 200 and video decoder 300 may use an elliptical model to determine the RSP. With the elliptical model, the RSP is obtained using an elliptical prediction model. The center of the ellipse may be the sample $s_{TL}$ that is top-left of the top-left sample of the block, for example. A reference sample position that is on the same ellipse as (x,y) from $s_{TL}$ may be chosen as the RSP; the $$r = k * \text{sqrt}((x+1)^2/a^2 + (y+1)^2/b^2)$$

Figure 15:
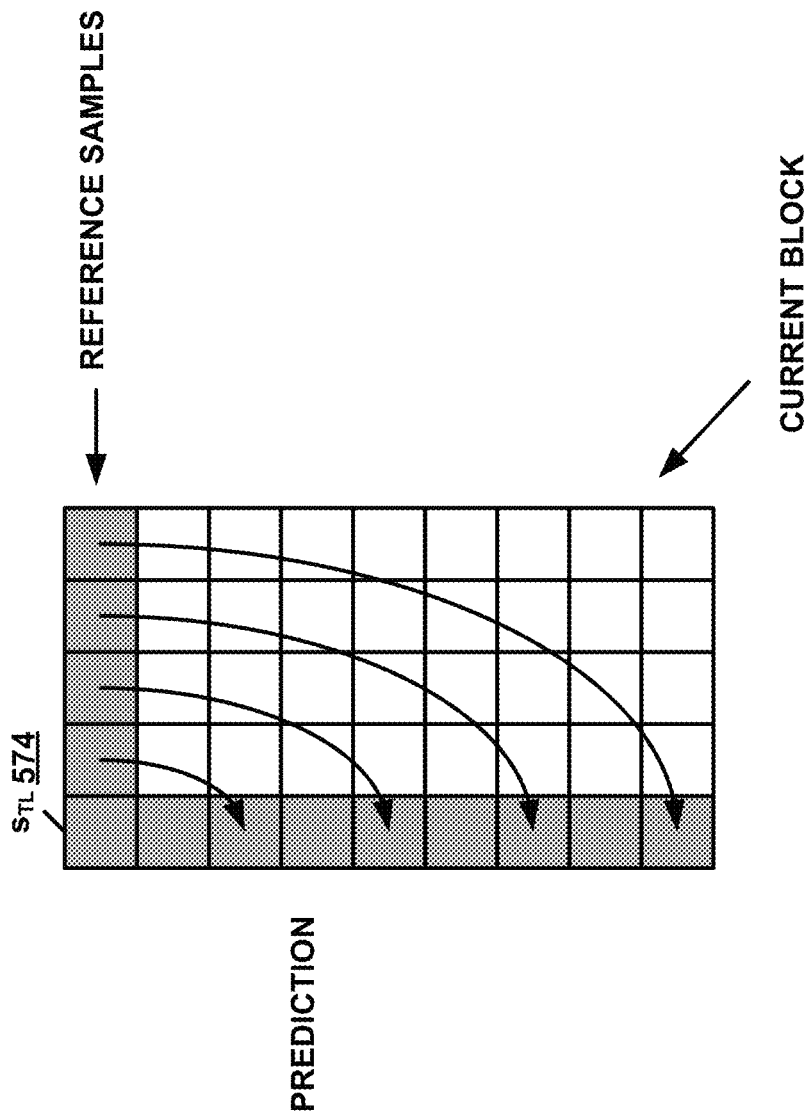
FIG. 15 is a conceptual diagram illustrating an example elliptical model for RSP derivation.

When the top reference samples are chosen, the RSP may be chosen as (r, 0) with respect to $s_{TL}$. When the left reference samples are chosen, the RSP may be chosen as (0, r) with respect to $s_{TL}$. The value k may be dependent on the values of a and b. An example of elliptical model is illustrated in FIG. 15. FIG. 15 is a conceptual diagram illustrating an example elliptical model for RSP derivation. It may be noted that in these examples, the sample $s_{TL}$ 574 was used to define the coordinates of the RSP, whereas in the circular model, the sample s0 was used to define the coordinates of the RSP. Although in some examples the elliptical model may apply to samples in rectangular blocks that are not square, more generally samples in a block that has any shape may use the elliptical model for RSP derivation. The elliptical model may also choose a center point that is different from the sample $s_{TL}$ 574. In other words, video encoder 200 and video decoder 300 may use a different center point than sample $s_{TL}$. The circular model may be considered a special case of the elliptical model.

Figure 16:
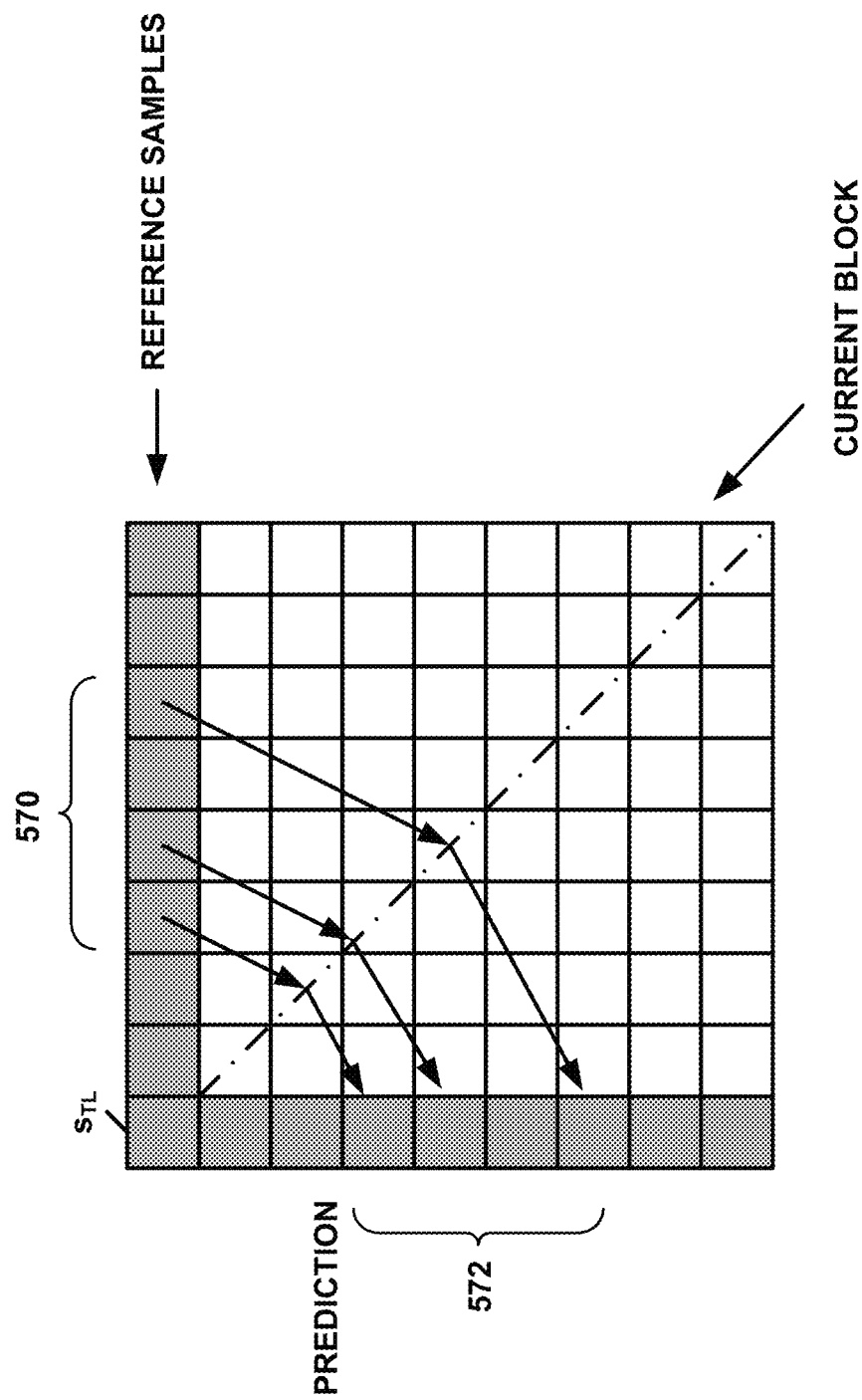
FIG. 16 is a conceptual diagram illustrating an example piece-wise linear (PWL) model for RSP derivation.
Figure 17:
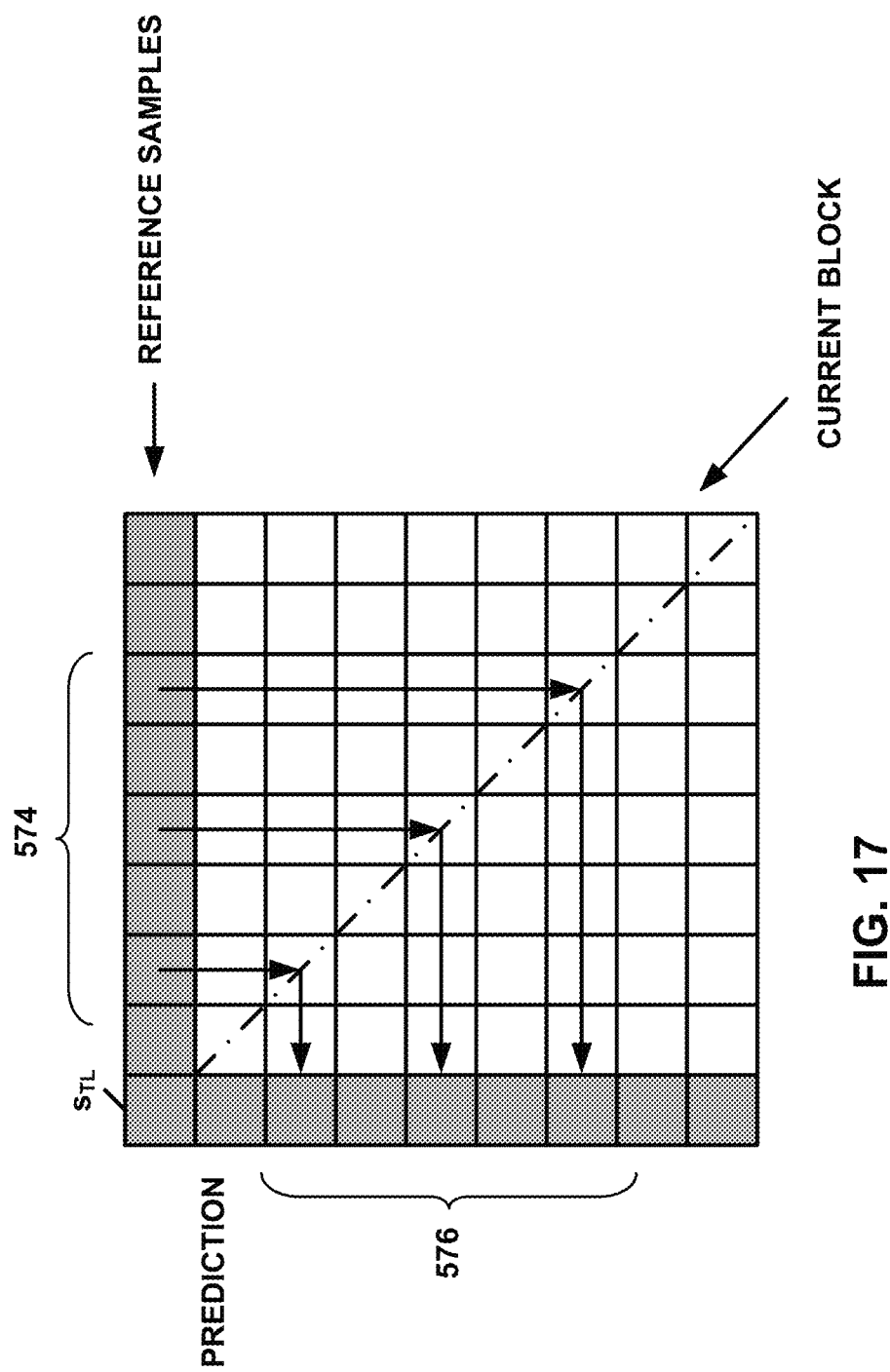
FIG. 17 is a conceptual diagram illustrating an example PWL model for RSP derivation.

The RSP may also be derived using a piece-wise linear (PWL) model which is described later herein with respect to FIGS. 16 and 17. For example, video encoder 200 and video decoder 300 may derive the RSP using a piece-wise linear model. Several parameters exist for a PWL model of RSP derivation. For example, one parameter is the number of pieces used to derive the PWL model. Another parameter is specifying the boundaries of the pieces of the PWL model. For each piece, a prediction model is specified. In some examples, the intra prediction model may be one of the intra prediction modes used in the codec, such as video encoder 200 and/or video decoder 300 (e.g., VER mode, HOR mode, or more generally an angular mode). In some examples, the intra prediction model may be any RSP derivation model specified in this disclosure or otherwise.

One or more parameters defined may also depend on the position of the sample in the block. For example, for samples that are close to the corners of the block, only one piece may be used to define the PWL model, whereas the rest of the samples may use more than one piece (e.g., 2) for the PWL model.

A non-exhaustive list of examples of PWL models of RSP derivation is provided. It must be understood that other ways of defining PWL models may exist and the techniques disclosed in this disclosure may also apply to those models. For simplicity, examples with two pieces are illustrated in FIGS. 16 and 17.

A line may be specified that is used to define two pieces of a PWL model. FIG. 16 shows an example where the main diagonal of the block is chosen to identify the two pieces of the model. In other words, FIG. 16 is a conceptual diagram illustrating an example PWL model for RSP derivation, where the main diagonal of the block is used to identify the two pieces of the PWL model. The top-right piece 570 of the model corresponds to an intra prediction mode (with mode number 55 in VVC WD4) and the bottom-left piece 572 of the model corresponds to another intra prediction mode (with mode number 70 in VVC WD4).

In another example, a line may be specified that is used to define two pieces of a PWL model. FIG. 17 shows an example where the main diagonal of the block is chosen to identify the two pieces of the model. That is, FIG. 17 is a conceptual diagram illustrating an example PWL model for RSP derivation, where the main diagonal of the block is used to identify the two pieces of the PWL model, and the vertical and horizontal intra mode directions are used for the two pieces. The top right piece 574 of the model corresponds to a vertical intra prediction mode (with mode number 50 in VVC WD4) and the bottom-left piece 576 of the model corresponds to a horizontal-like intra prediction mode. Such a mode may be useful for predicting/coding the bottom right corner of a square or rectangular shaped object in the content.

In other examples, a horizontal line may be specified that is used to define the two pieces of a PWL model. In such a case, video encoder 200 and video decoder 300 may use a horizontal line to divide two pieces of a PWL model. The top piece of the model may correspond to one intra prediction mode and the bottom piece of the model may correspond to a different intra prediction mode. In this example, samples that are above the horizontal line (in some case including the samples on the horizontal line) may use prediction specified by the first model and samples below the horizontal line (in some case including the samples on the horizontal line) may use prediction specified by the second mode. In other examples, a vertical line may be specified that is used to define the two pieces of a PWL model. In such a case, video encoder 200 and video decoder 300 may use a vertical line to divide two pieces of a PWL model. The left piece may correspond to one intra prediction mode and the right piece may correspond to a different intra prediction mode. In this example, samples that are to the left of the vertical line (in some case including the samples on the vertical line) may use prediction specified by the first model and samples to the right of the vertical line (in some case including the samples on the vertical line) may use prediction specified by the second mode.

Each combination of the various values of the parameters above may be considered an intra mode for prediction. In typical cases, a set of possible values for each parameter (e.g., number of pieces may be two or three, the line used to define the pieces may be the main diagonal, vertical line in the middle of the block and horizontal line in the middle of the block, etc.) may be defined, and a further subset of combinations of the values of the parameters may be defined to be valid prediction modes (e.g., a 2-piece PWL model with a main diagonal may be one prediction mode, a 2-piece PWL with a vertical line in the middle of the block may be another prediction mode, etc.). A syntax element or a mode indicator may be specified (and signaled in the bitstream or derived by the codec, such as video encoder 200, to convey the exact prediction method used in the codec, such as video encoder 200, for the sample.

In some examples, a parametric model of RSP derivation (e.g., circular or elliptical) may be approximated by a PWL model of RSP derivation. For example, video encoder 200 and video decoder 300 may utilize a PWL model with a plurality of pieces such that the plurality of pieces approximates at least a portion of a circle or ellipse. By using a PWL model with a plurality of pieces that approximates at least a portion of a circle or ellipse, video encoder 200 and video decoder 300 may approximate a circular or elliptical RSP derivation model with a PWL RSP derivation model. In this manner, in a PWL model approximation of circular RSP derivation, the RSP may be derived to be along a row or column of neighboring pixels to the current block at a position approximately equal to a radius from an upper-left neighboring pixel or an upper-right neighboring pixel to a current sample within a current block. In this manner, in a PWL model approximation of elliptical RSP derivation, the RSP may be derived to be along a row or column of neighboring pixels to the current block approximately at a position in an ellipse that includes a current sample.

In some examples, a table-based model may be used to identify an RSP for the sample. For example, video encoder 200 and video decoder 300 may use a table to look up the RSP. In one example, a table may contain a tuple of entries for each sample position in the block; the entries in this tuple may be used to derive the values of (xR, yR) for the sample. For example, the tuple may be an x-coordinate xC and y-coordinate yC, and the RSP may be derived as (xC, yC). For sample s(x, y) in the block, if the tuple corresponds to position (x, y) (xC, yC), then the RSP is chosen as (xC, yC). In other words, video encoder 200 and video decoder 300 may look up position (x, y) in a table and find the tuple corresponding to the position (x, y). Video encoder 200 and video decoder 300 may derive the RSP to be tuple corresponding to the position (x, y) in the table, such as (xC, yC). In some examples, a table that defines an RSP derivation may correspond to a particular mode that may be indicated in the bitstream or inferred/derived by a codec, such as video encoder 200 or video decoder 300, respectively. The table may be pre-defined in the codec, such as video encoder 200 and video decoder 300, or may be signaled in the bitstream by video encoder 200.

In some examples, a parametric model of RSP derivation (e.g., circular or elliptical) may be approximated by a table-based reference sample derivation. For example, video encoder 200 and video decoder 300 may use a parametric model to derive the RSP. The parametric model is a generalization of the RSP derivation methods, where the RSP may be defined as a parametric function. The parameters of the parametric function may be pre-determined or specified by one or more syntax elements in the bitstream. The parameters may also be derived using neural network models. In this manner, in a parametric model approximation of circular RSP derivation, the RSP may be derived to be along a row or column of neighboring pixels to the current block at a position approximately equal to a radius from an upper-left neighboring pixel or an upper-right neighboring pixel to a current sample within a current block. In this manner, in a parametric model approximation of elliptical RSP derivation, the RSP may be derived to be along a row or column of neighboring pixels to the current block approximately at a position in an ellipse that includes a current sample.

In some examples, video encoder 200 and video decoder 300 may use multi-model RSP derivation. In examples where video encoder 200 and video decoder 300 use multi-model RSP derivation, video encoder 200 and video decoder 300 may use more than one model in an RSP derivation. For example, an RSP derivation may include both circular model RSP derivation methods that may be used by the samples in the block, and different samples in the block may use different RSP derivation methods. In other words, for example, video encoder 200 and video decoder 300 may use one of the above-discussed circular models (e.g., the circular model RSP derivation methods shown in two or more of the examples of FIG. 13A, 13B, FIG. 14, etc.) for deriving the RSP for some samples in the block and may use another of the above-discussed circular models for other samples in the block. In another example, for samples that are closer to the top and left boundaries of the block, video encoder 200 and video decoder 300 may use a planar mode for prediction; whereas, for the other samples, video encoder 200 and video decoder 300 may use a circular model for RSP derivation. Video encoder 200 and video decoder 300 may use any combination of RSP derivation models when using a multi-model for RSP derivation.

The derivation of a sample value at the RSP is now discussed. The reference sample value sR at the RSP may be obtained by directly accessing a reference sample value or may be obtained by a derivation from the reference samples in the neighborhood of the RSP (xR, yR). In some examples, when the position (xR, yR) corresponds to a reconstructed sample coordinate, the value sR may be set directly equal to the reconstructed sample value at the position (xR, yR). In other words, in some examples, video encoder 200 and video decoder 300 may use the reference sample value sR as the predicted value when the position (xR, yR) corresponds to a reconstructed sample coordinate. In some examples, sR may be derived using interpolation of reconstructed samples. A set of n samples in the neighborhood of the RSP may be defined, $\{(x_i, y_i), i=0 \ldots n-1\}$, and the sample value sR may be obtained as a filtered version of samples in the set. For example, sR may be derived as follows:

$$sR = \frac{1}{K} \sum_{i=0}^{n-1} a_i r(x_i, y_i)$$

In the equation above, r(x,y) denotes reconstructed reference samples, $a_i$ are coefficients used, K is a normalizing factor and each one of $(x_i, y_i)$ for $i=0 \ldots n-1$ is a sample in the neighborhood of the RSP. The coefficients and the neighborhood together identify or specify a filter. In other words, video encoder 200 and video decoder 300 may use the coefficients and the reference samples in the neighborhood together to identify or specify as a filter. The filter used for obtaining sR may also depend on the RSP (different filters may be used for different RSPs. Padding may be applied before the application of the filter to derive one or more samples that may be unavailable).

In some examples, a first set of available reconstructed reference samples may be defined for each block. When all the samples of the neighborhood of the RSP belongs to the first set, one filter may be used. When one or more samples of the neighborhood is not available in the first set, a different filter may be used.

When more than one set of coefficients may be used to obtain sR for a sample s(x,y), or more than one neighborhood may be defined for the RSP (see e.g., MRLIdx=0 through MRLIdx=3 of FIG. 11), the codec (e.g., video encoder 200) may signal an index to a particular set of coefficients or the particular neighborhood to be used to form a filter to obtain sR for sample s(x,y). Alternatively, in some examples, video encoder 200 and video decoder 300 may have a process to derive a particular filter to be used for a particular reference sample. In other words, video encoder 200 and video decoder 300 may perform processes to derive a particular filter to obtain sR for a sample s(x,y) without signaling an index to a particular set of coefficients or a particular neighborhood used to form the particular filter.

Although in typical cases, the reconstructed sample value used in the derivation process is the sample value before application of deblocking filters, loop-filters and other post-reconstruction filter operations, the derivation method may also be applied on reconstructed samples that have been subjected to one or more filtering operations or post-reconstruction operations. In other words, video encoder 200 and video decoder 300 may, in some examples, derive the sample value sR based on reconstructed samples that have been filtered or undergone post-reconstruction operations.

In some examples, the predicted value $s_{pred}(x,y)$ of the sample $s(x,y)$ may be set equal to the sample value sR, or in some cases undergo further processing. In some examples, one or more samples of the block are predicted. Subsequently, a set of filtering operations may be performed by filtering the samples in the neighborhood of the predicted sample, in some cases including the predicted sample and one or more reconstructed reference samples for the block. One example of such a process is the PDPC prediction process, but similar filtering operations may also be applied to derive the value of the predicated sample $s_{pred}(x,y)$. In other words, video encoder 200 and video decoder 300 may determine the predicted value $s_{pred}(x,y)$ of the sample $s(x,y)$ to be equal to the sample value sR, or video encoder 200 and video decoder 300 may perform further processing such as filtering or PDPC prediction.

In other examples, for each sample $s(x,y)$, a plurality of reference samples (i.e., more than one RSP for each sample) may also be derived. The prediction sample value may be derived from the sample values of the plurality of RSPs. For example, for each sample $s(x,y)$, $n_1$ RSPs with coordinates $(xR_i, yR_i)$ for $i=0 \ldots n_1-1$, may be derived (each n being an RSP for the sample). Each RSP may be derived by an RSP derivation method disclosed in this disclosure, or in general by any method that derives an RSP for a sample. In other words, video encoder 200 and video decoder 300 may use any method described herein or any other method to derive an RSP and utilize a plurality of RSPs for a given sample to derive the predicted value.

The sample values corresponding to these RSPs, $sR_i$, for $i=0 \ldots n_1-1$, may also be derived based on a method disclosed in this disclosure, or, in general, by any method that derives the sample value for a particular RSP. For example, video encoder 200 and video decoder 300 may determine sample values for each of the plurality of RSPs based on any of the techniques described herein or by any other technique that may derive a sample value for an RSP. In some examples, the value of $n_1$ is 2.

The reference sample value sR for the sample $s(x,y)$ may be derived from the samples values of the RSPs, $sR_i$, for $i=0 \ldots n_1-1$. In one example, sR is derived as an average value of $sR_i$.

$$sR = \frac{1}{n_1} \sum_{i=0}^{n_1-1} sR_i$$

In other words, video encoder 200 and video decoder 300 may determine an average value of the sample values of the plurality of RSPs. In some examples, the division operation may be implemented with or without an offset, a look-up table or other fixed-point operations; in other examples, the value of $n_1$ is chosen to be a power of 2.

In another example, sR is derived as a weighted average of the values $sR_i$.

$$sR = \frac{1}{K} \sum_{i=0}^{n_1-1} w_i sR_i$$

In the equation above, $$K = \sum_{i=0}^{n_1-1} w_i$$

where n is a number of RSPs and $w_i$ is a weight. In other words, video encoder 200 and video decoder 300 may determine a weighted average of the sample values of the plurality of RSPs to determine the sample value. In some examples, the value of $w_i$ is derived from the coordinates of the sample $s(x,y)$ from coordinates of the i-th RSP.

Coding, signaling and inference according to the techniques of this disclosure are now discussed. The identification of the RSP derivation method used should be the same, or similar, at the encoder and the decoder. In some examples, video encoder 200 chooses an RSP derivation method based on an RD-search (rate-distortion search), or based on processes or rules to determine an RSP derivation method. The processes or rules for determining the RSP derivation method may depend on the block size, intra mode, split characteristics (e.g., horizontal split, vertical split, quad split, etc.) of the block and neighboring blocks, or other factors. Video decoder 300 may use similar processes or rules to determine the RSP derivation method to be used for the sample.

In some examples, an intra mode is identified by a number. One value of the number may be used to identify a particular RSP derivation method. For example, each particular RSP derivation method may be identified by a different number. For example, a circular RSP derivation method (which is a special case of an elliptical RSP derivation method) may be identified by a number Z. Video encoder 200 may derive an RSP using the circular RSP derivation method and may signal the number Z as a syntax element in the bitstream. Video decoder 300 may obtain the syntax element from the bitstream and determine that the number Z was signaled. Video decoder 300 may then derive the RSP using the RSP derivation method identified by the number Z, i.e., the circular RSP derivation method, in this example. In this manner, video encoder 200 may signal to video decoder 300 the particular RSP derivation method video encoder 200 used for a particular block of video data and video decoder 300 may derive the RSP using the same RSP derivation method.

In some examples, a list of RSP derivation methods, $S_{RSP}$, is identified for the sample. In some examples, the list of RSP derivation methods may be predetermined and stored by video encoder 200 and video decoder 300. In other examples, the list of RSP derivation methods may be determined by video encoder 200 during encoding (for example, based on most commonly used RSP derivation methods) and may be signaled to video decoder 300. In such examples, a flag may be signaled by video encoder 200 to indicate whether an RSP derivation method belonging to $S_{RSP}$ is used for the sample. When one value of the flag indicates that RSP derivation method from $S_{RSP}$ is used, an index to the list $S_{RSP}$ is signaled by video encoder 200 to identify the RSP derivation method to be used. In other words, video encoder 200 may signal a flag that indicates whether a list of RSP derivation methods (i.e., $S_{RSP}$) includes the RSP derivation method to be used for a block. If the flag has a value that indicates that the list of RSP derivation methods includes the RSP derivation method, video encoder 200 may also signal an index that indicates a position within the list of RSP derivation methods of the RSP derivation method to be used for the block.

In cases where video encoder 200 uses a plurality of RSPs for a given block of video data using a plurality of RSP derivation methods, video encoder 200 may signal the plurality of RSP derivation methods used in the bitstream to video decoder 300. For example, a set of indices identifying the plurality of RSP derivations may be signaled. In other words, video encoder 200 may signal the plurality of RSP derivation methods and video decoder 300 may determine the plurality of RSP derivation methods based on the signaling.

In some examples, identifying a subset of the RSP derivation methods may be sufficient, and the remaining subset of RSP derivation methods may be inferred. For example, for a particular sample, a circular RSP derivation method and a PWL-model based RSP derivation method may be inferred to be the subset of RSP derivation methods available. Based on a position of a sample in a block, and intra modes used by samples in neighboring blocks (e.g., a vertical mode used in an above neighboring block, a horizontal mode used in a left neighboring block, etc.), the circular model may be chosen by video encoder 200 and video decoder 300. In other words, video encoder 200 and video decoder 300 may infer a subset of RSP derivation models, such as a circular RSP model and a PWL RSP model. Video encoder 200 and video decoder 300 may select a particular RSP derivation model from the subset of RSP derivation models based on parameters, such as the position of the sample and the mode used for samples in neighboring blocks.

Figure 18:
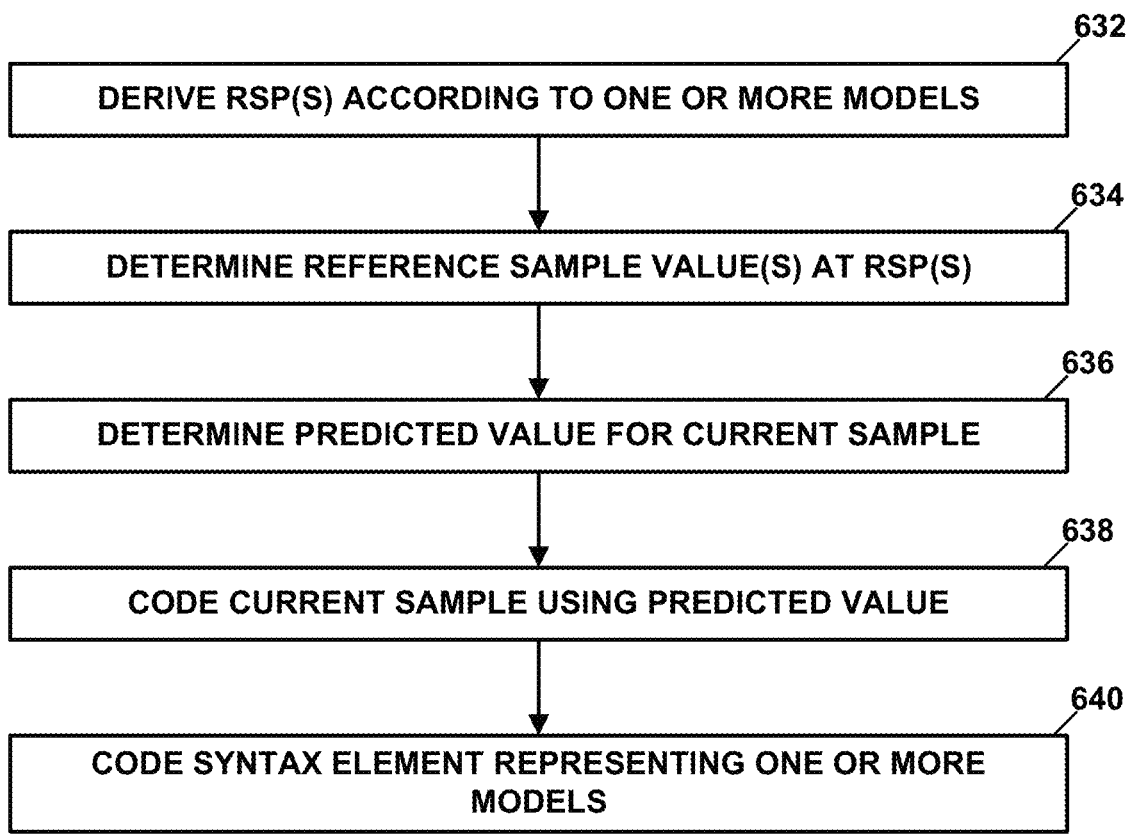
FIG. 18 is a flow diagram illustrating example techniques according to this disclosure.

FIG. 18 is a flow diagram illustrating example techniques according to this disclosure. Video encoder 200 or video decoder 300 may derive an RSP for a current sample of a current block of video data according to one or more RSP derivation models (632). In some examples, deriving the RSP may include selecting one or more RSP derivation models. The one or more RSP derivation models may include a circular model, an elliptical model, a piece-wise linear model, a table-based model, or a parametric model. In some examples, video encoder 200 or video decoder 300 may derive a plurality of RSPs for the current sample, rather than a single RSP. In some examples, video encoder 200 or video decoder 300 may select the one or more RSP derivation models based on one or more of a position of the current sample within the current block, a width of the current block, a height of the current block, a width of a neighboring block to the current block, a height of the neighboring block, an intra-prediction mode used to intra-predict the neighboring block, or an intra-prediction direction used to intra-predict the neighboring block. For example, if the current sample is at position (1,0) of the current block, video encoder 200 may select a particular RSP derivation method, such as an elliptical RSP derivation method. In another example, if the current block is a certain width or a certain height or a certain width to height ratio or if a neighboring block is a certain width or a certain height or a certain width to height ratio, video encoder 200 may select a particular RSP derivation method, such as a circular RSP derivation method. In yet another example, video encoder 200 may select an RSP derivation method based on the intra-prediction mode and/or the intra-prediction direction of a neighboring block.

Video encoder 200 or video decoder 300 may determine a reference sample value for a reference sample at the RSP for the current sample (634). In some examples, video encoder 200 or video decoder 300 may filter the reference sample value (e.g., as described in any of the examples provided elsewhere in this disclosure). In the case that video encoder 200 or video decoder 300 derives a plurality of RSPs for the current sample, video encoder 200 or video decoder 300 may determine a plurality of reference sample values. For instance, in an example where video encoder 200 and video decoder 300 determine a plurality of reference sample values, video encoder 200 or video decoder 300 may determine a reference sample value for each RSP that video encoder 200 or video decoder 300 derived for the current sample.

Video encoder 200 or video decoder 300 may determine a predicted value for the current sample using the reference sample (636). In some examples, video encoder 200 or video decoder 300 may determine the predicted value for the current sample by setting the predicted value equal to the reference sample value. In other examples, video encoder 200 or video decoder 300 may determine the predicted value for the current sample by setting the predicted value equal to the reference sample value and filtering samples in a neighborhood of the current sample to modify the predicted value for the current sample. In some examples where video encoder 200 or video decoder 300 derive a plurality of RSPs for the current sample and a plurality of reference sample values, video encoder 200 or video decoder 300 may determine the predicted value for the current sample using the plurality of reference sample values. For instance, in some examples, video encoder 200 or video decoder 300 may use an average or a weighted average of the plurality of reference sample values to determine the predicted value for the current sample.

Video encoder 200 or video decoder 300 may code the current sample using the predicted value (638). For example, video encoder 200 or video decoder 300 may use that predicted value to predict the current block of video data and calculate the residual block for the current block.

In some examples, video encoder 200 or video decoder may code a syntax element representing the one or more RSP derivation models used to derive the RSP(s) for the current sample (640). For example, if the one or more RSP derivation models was a circular model, video encoder 200 may encode a syntax element representing the circular model and video decoder 300 may decode the syntax element representing the circular model. In some examples, if video encoder 200 used more than one RSP derivation model for the current sample, video encoder 200 may encode a syntax element for each RSP derivation model used for the current sample and video decoder 300 may decode the syntax element for each RSP derivation model used for the current sample. In other examples, video encoder 200 or video decoder may not code a syntax element representing each of the one or more RSP derivation models used to derive the RSP(s) for the current sample.

The interaction of the RSP techniques described herein with other related topics is now discussed. Regarding block shapes/wide angle prediction, although the description of the techniques and examples of this disclosure assume a rectangular block shape, one or more methods described may apply to other block shapes also. For shapes other than rectangular blocks, a set of reference samples may be defined. The definition of the RSP for a sample s(x,y) may be modified such that the RSP is one among the reference samples for the block, or may be derived/interpolated from the reference samples of the block. In other words, video encoder 200 and video decoder 300 may have a set of reference samples defined for shapes other than rectangular blocks or may derive the RSP from reference samples of the block.

The derivation of the RSP when there are multiple reference lines is now discussed. The RSP derivation methods disclosed in this disclosure identify the coordinates (xR, yR) of the reference sample position. Typically, the intra prediction reference line closest to the block (i.e., MRLIdx equal to 0) is used to identify the reconstructed reference samples (RRS). In this case, the value of (xR, yR) is chosen such that the value of (xR, yR) corresponds to an RRS position, or that sample value at RSP may derived from the RRS. When the block uses a reference line with MRLIdx>0, the RSP derivation is adjusted to ensure that RSP corresponds to the corresponding reference line, and that the sample value at the RSP is derived from the identified RRS in the neighborhood of the RSP. In other words, when there are multiple reference lines for a given sample and video encoder 200 and video decoder 300 use a reference line with MRLIdx>0 (see FIG. 11), video encoder 200 and video decoder 300 may adjust the RSP derivation to ensure that the RSP corresponds to the corresponding reference line, and that the sample value at the RSP is derived from the identified RRS in the neighborhood of the RSP.

The interaction of the disclosed techniques with PDPC is now discussed. PDPC is applied to samples in a block, and predicted samples of the block are modified based on reconstructed reference samples. For applying PDPC with some angular modes, a derivation similar to RSP derivation for intra prediction is made to identify secondary reference samples. For example, video encoder 200 and video decoder 300 may identify secondary reference samples when applying PDPC for some angular modes. When PDPC is applied in conjunction with methods disclosed in this disclosure, a PDPC-RSP derivation method may be defined, which may depend on the sample position (x, y) and the RSP derivation method used for the predicted sample. For example, if a circular model is used for RSP derivation for intra mode prediction, another circular model may be used for derivation of the position of the secondary reference sample. In some examples, the predicted samples for a block may be modified by applying a boundary filter (primarily to samples near the boundaries of the block); this may have the effect of smoothing the predicted samples values near the block boundaries. When boundary filtering is used, the filtering operation may also be modified when used with a block that is coded with one or more RSP derivation methods of this disclosure. For example, when a block is coded with an RSP derivation method, one or more samples to be used for filtering the boundary samples may also be derived based on the RSP derivation methods. For example, for a circular mode derivation, the samples to be filtered may also be chosen on an circular arc, as in the circular mode. In other words, video encoder 200 and video decoder 300 may derive boundary filters based on the RSP derivation method(s).

The interaction of the disclosed techniques with CIIP (combined inter-intra prediction) is now discussed. The RSP derivation methods disclosed in this disclosure may also be applied (e.g., by video encoder 200 and video decoder 300) to derive intra prediction samples that are used in multi-hypothesis coding of inter pictures.

The interaction of the disclosed techniques with ISP (intra sub-partition prediction) is now discussed. ISP splits a coding unit into two or more subblocks, where each subblock in the coding unit is reconstructed, in a particular decoding order, before processing (e.g., prediction and other steps involved in intra prediction) the subsequent subblock.

The RSP derivation methods of this disclosure may also apply to blocks that are coded with ISP. For example, a piecewise linear model may be applied, where the boundaries of the subblocks may be identified as boundaries defining the pieces of the PWL. In other words, video encoder 200 and video decoder 300 may derive the RSP for ISP coded blocks according to the techniques of this disclosure, such as using a PWL model for deriving the RSP.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 19A:
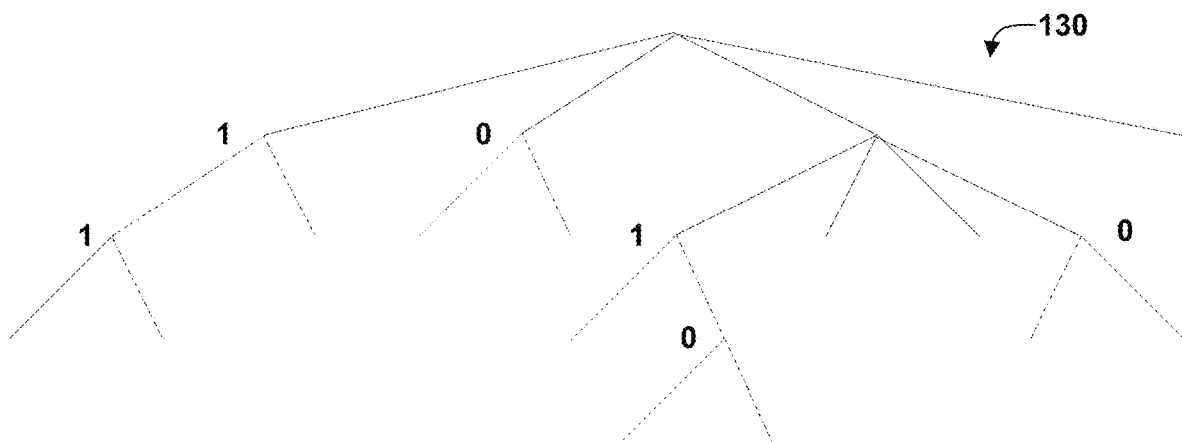
FIGS. 19A and 19B are conceptual diagrams illustrating an example quadtree binary tree (QTBT) structure, and a corresponding coding tree unit (CTU).
Figure 19B:
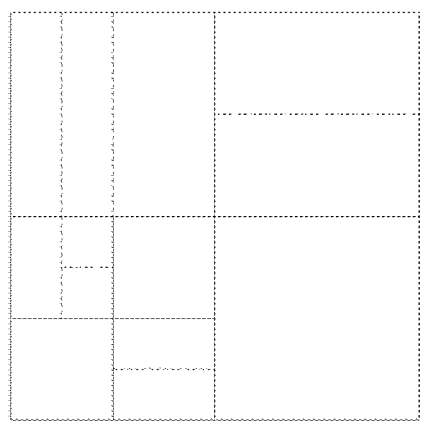

FIGS. 19A and 19B are conceptual diagram illustrating an example QTBT structure 130, and a corresponding CTU 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 19B may be associated with parameters defining sizes of blocks corresponding to nodes of QTBT structure 130 at the first and second levels. These parameters may include a CTU size (representing a size of CTU 132 in samples), a minimum quadtree size (Min QTSize, representing a minimum allowed quadtree leaf node size), a maximum binary tree size (Max BTSize, representing a maximum allowed binary tree root node size), a maximum binary tree depth (Max BTDepth, representing a maximum allowed binary tree depth), and a minimum binary tree size (Min BTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (Max BTSize), they can be further partitioned by respective binary trees. The binary tree splitting of one node can be iterated until the nodes resulting from the split reach the minimum allowed binary tree leaf node size (Min BTSize) or the maximum allowed binary tree depth (Max BTDepth). The example of QTBT structure 130 represents such nodes as having dashed lines for branches. The binary tree leaf node is referred to as a CU, which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the Min QTSize is set as 16×16, the Max BTSize is set as 64×64, the Min BTSize (for both width and height) is set as 4, and the Max BTDepth is set as 4. The quadtree partitioning is applied to the CTU first to generate quad-tree leaf nodes. The quadtree leaf nodes may have a size from 16×16 (i.e., the Min QTSize) to 128×128 (i.e., the CTU size). If the leaf quadtree node is 128×128, it will not be further split by the binary tree, since the size exceeds the Max BTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches Max BTDepth (4, in this example), no further splitting is permitted. When the binary tree node has width equal to Min BTSize (4, in this example), it implies no further horizontal splitting is permitted. Similarly, a binary tree node having a height equal to Min BTSize implies no further vertical splitting is permitted for that binary tree node. As noted above, leaf nodes of the binary tree are referred to as CUs, and are further processed according to prediction and transform without further partitioning.

Figure 20:
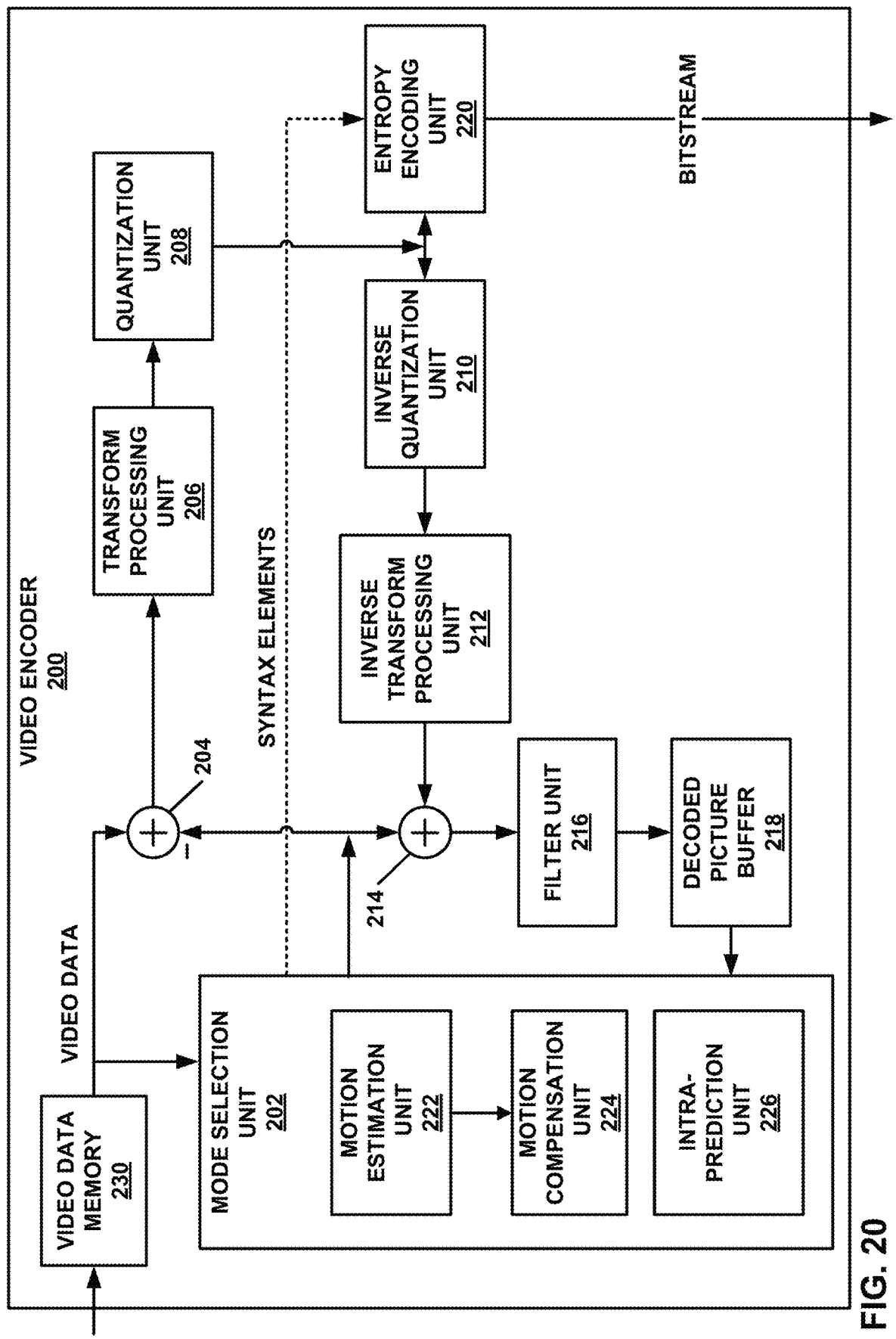
FIG. 20 is a block diagram illustrating an example video encoder that may perform the techniques of this disclosure.

FIG. 20 is a block diagram illustrating an example video encoder 200 that may perform the techniques of this disclosure. FIG. 20 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 20, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 20 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block. For example, when generating the prediction block, intra-prediction unit 226 may derive a reference sample position (RSP) for a current sample of a current block, determine a reference sample value for a reference sample at the RSP, and determine a predicted value for the current sample using the reference sample value, as described above with reference to FIG. 18.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may apply multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. For example, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data (e.g., video data memory 230), and one or more processing units implemented in circuitry and configured to derive a reference sample position (RSP) for a current sample of a current block (e.g., by intra-prediction unit 226); determine a reference sample value for a reference sample at the RSP (e.g., by intra-prediction unit 226); determine a predicted value for the current sample using the reference sample value (e.g., by intra-prediction unit 226); and encode the current sample using the predicted value. Encoding the current sample using the predicted value may comprise determining a residual value indicating a difference between the current sample and the predicted value. In some examples, encoding the current sample may further comprise one or more of applying a transform to the residual value or quantizing the residual value or transform coefficient resulting from applying the transform the residual value.

Figure 21:
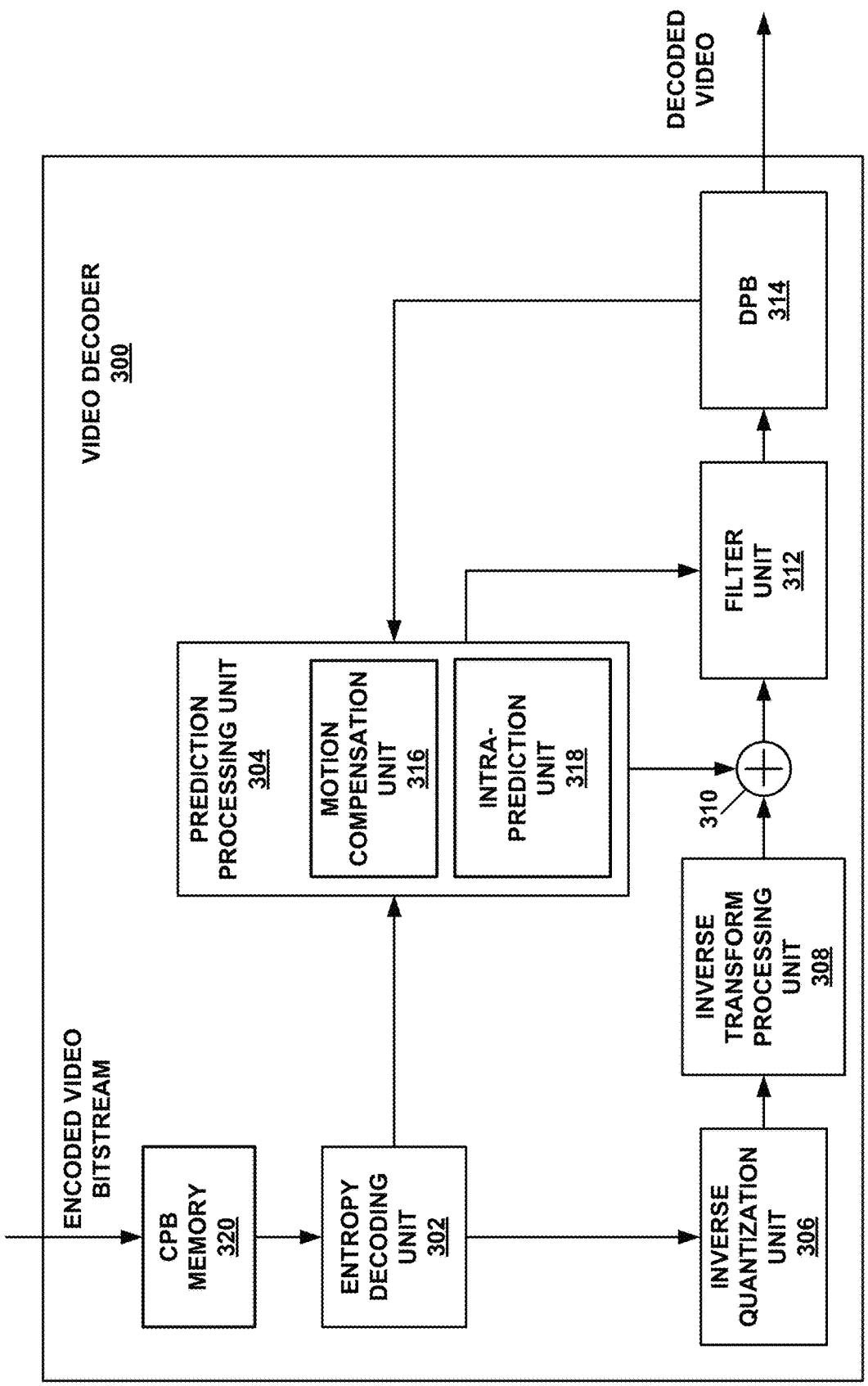
FIG. 21 is a block diagram illustrating an example video decoder that may perform the techniques of this disclosure.

FIG. 21 is a block diagram illustrating an example video decoder 300 that may perform the techniques of this disclosure. FIG. 21 is provided for purposes of explanation and is not limiting on the techniques as broadly exemplified and described in this disclosure. For purposes of explanation, video decoder 300 is described according to the techniques of JEM, VVC, and HEVC. However, the techniques of this disclosure may be performed by video coding devices that are configured to other video coding standards.

In the example of FIG. 21, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 21 are illustrated to assist with understanding the operations performed by video decoder 300. The units may be implemented as fixed-function circuits, programmable circuits, or a combination thereof. Similar to FIG. 21, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements, including prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 20).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 20). Intra-prediction unit 318 may retrieve data of neighboring samples to the current block from DPB 314. For example, when generating the prediction block, intra-prediction unit 318 may derive a reference sample position (RSP) for a current sample of a current block, determine a reference sample value for a reference sample at the RSP, and determine a predicted value for the current sample using the reference sample value, as described above with reference to FIG. 18.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data (e.g., CPB memory 320), and one or more processing units implemented in circuitry and configured to derive a reference sample position (RSP) for a current sample of a current block (e.g., by intra-prediction unit 318); determine a reference sample value for a reference sample at the RSP (e.g., by intra-prediction unit 318); determine a predicted value for the current sample using the reference sample value (e.g., by intra-prediction unit 318); and decode the current sample using the predicted value. In some examples, decoding the current sample using the predicted value may comprise adding the predicted value to a residual value. In some examples, decoding the current sample using the predicted value may comprise using the predicted value as the current sample.

Figure 22:
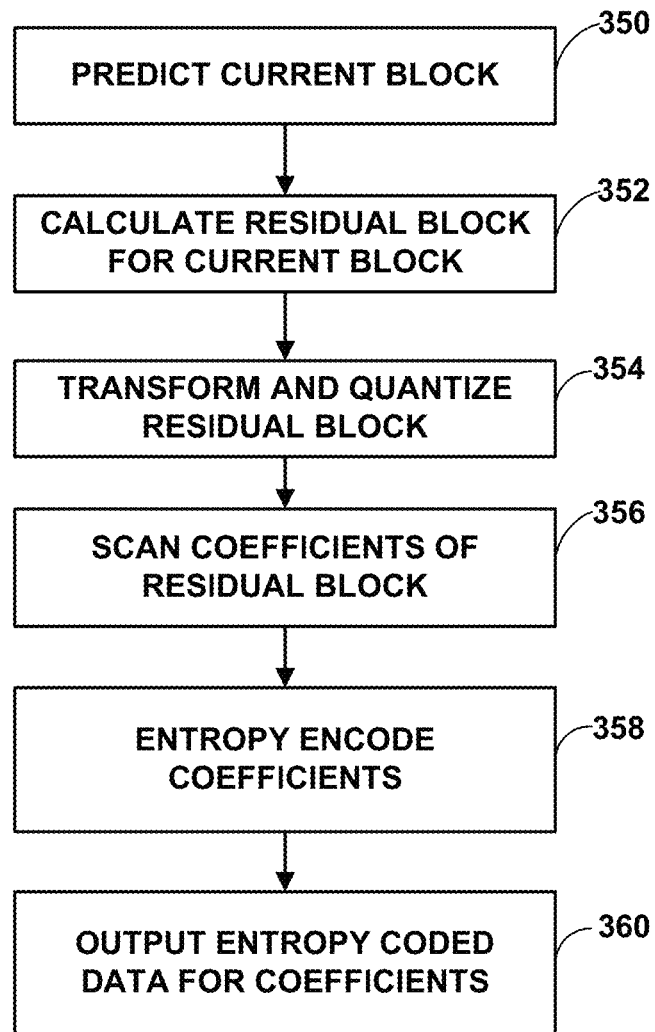
FIG. 22 is a flowchart illustrating an example method for encoding a current block of video data.

FIG. 22 is a flowchart illustrating an example method for encoding a current block. The current block may comprise a current CU. Although described with respect to video encoder 200 (FIGS. 1 and 20), it should be understood that other devices may be configured to perform a method similar to that of FIG. 22.

In this example, video encoder 200 initially predicts the current block (350). For example, video encoder 200 may form a prediction block for the current block. For example, video encoder 200 (e.g., intra-prediction unit 226) may derive an RSP for a current sample of a current block of video data according to one or more RSP derivation models. The one or more RSP derivation models may include a circular model, an elliptical model, a piece-wise linear model, a table-based model, or a parametric model. Video encoder 200 (e.g., intra-prediction unit 226) may determine a reference sample value for a reference sample at the RSP. Video encoder 200 (e.g., intra-prediction unit 226) may determine a predicted value for the current sample using the reference sample. Video encoder 200 (e.g., intra-prediction unit 226) may repeat this process for each sample in the current block to form a prediction block for the current block.

Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 23:
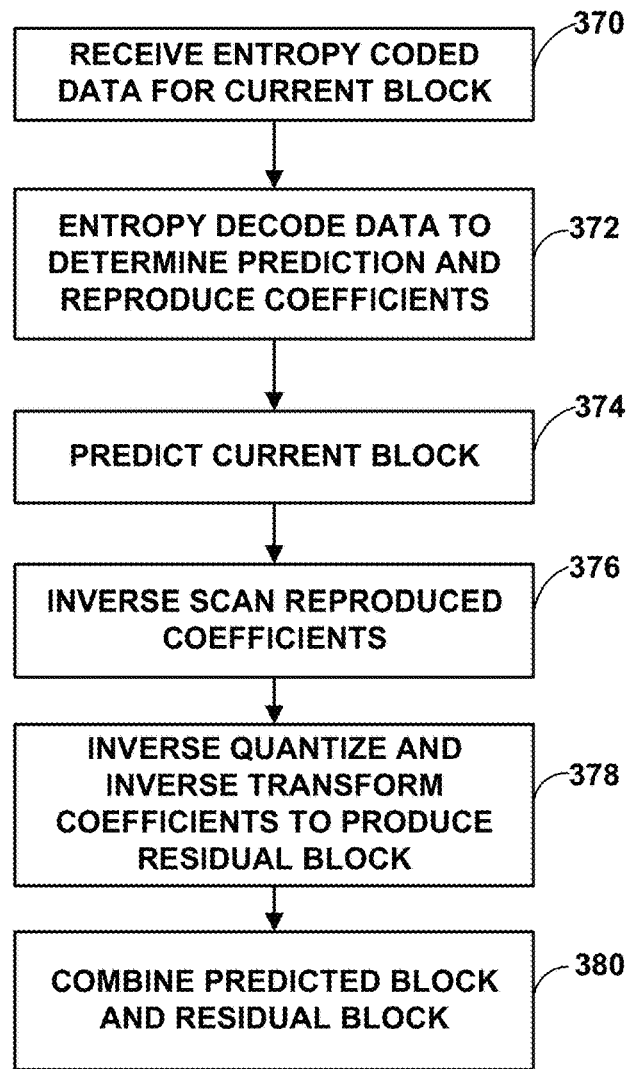
FIG. 23 is a flowchart illustrating an example method for decoding a current block of video data.

FIG. 23 is a flowchart illustrating an example method for decoding a current block of video data. The current block may comprise a current CU. Although described with respect to video decoder 300 (FIGS. 1 and 21), it should be understood that other devices may be configured to perform a method similar to that of FIG. 23.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. For example, when using intra-prediction according to the techniques of this disclosure, video decoder 300 (e.g., intra-prediction unit 318) may derive an RSP for a current sample of a current block of video data according to one or more RSP derivation models. The one or more RSP derivation models may include a circular model, an elliptical model, a piece-wise linear model, a table-based model, or a parametric model. Video decoder 300 (e.g., intra-prediction unit 318) may determine a reference sample value for a reference sample at the RSP. Video decoder 300 (e.g., intra-prediction unit 318) may determine a predicted value for the current sample using the reference sample. Video decoder 300 (e.g., intra-prediction unit 318) may repeat this process for each sample in the current block to form a prediction block for the current block.

Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Example techniques of the present disclosure may be as set forth in the following non-limiting set of examples.

Example 1

A method of coding video data, the method comprising: deriving a reference sample position (RSP) for a current sample of a current block; determining a reference sample value for a reference sample at the RSP; determining a predicted value for the current sample using the reference sample value; and coding the current sample using the predicted value.

Example 2

The method of example 1, wherein the RSP comprises a position (xR, yR) relative to a top-left sample of the current block.

Example 3

The method of any of examples 1 or 2, wherein the current sample is at position (x, y) in the current block, the block having a width of W and a height of H, x being in the range [0, W−1], y being in the range [0, H−1].

Example 4

The method of any of examples 1-3, wherein deriving the RSP comprises deriving the RSP according to an RSP derivation mode, the method further comprising coding a value for a syntax element representing the RSP derivation mode.

Example 5

The method of any of examples 1-4, wherein the current sample comprises a sample of a plurality of samples of the current block, further comprising performing the method of any of examples 1-4 for each sample of the plurality of samples.

Example 6

The method of any of examples 1-5, wherein deriving the RSP comprises deriving the RSP according to a model that depends on one or more of a position of the current sample within the current block, a width of the current block, a height of the current block, a width of a neighboring block to the current block, a height of the neighboring block, an intra-prediction mode used to intra-predict the neighboring block, or an intra-prediction direction used to intra-predict the neighboring block.

Example 7

The method of example 6, wherein the model comprises one or more of a circular model, an elliptical model, a piece-wise linear model, a table-based model, or a parametric model.

Example 8

The method of example 7, wherein the model comprises the circular model, and wherein deriving the RSP according to the circular model comprises deriving the RSP to be along a row or column of neighboring pixels to the current block at a position having a radius from an upper-left neighboring pixel that is equal to a radius from the upper-left or upper-right neighboring pixel to the current sample within the block.

Example 9

The method of example 7, wherein the model comprises the elliptical model, and wherein deriving the RSP according to the elliptical model comprises deriving the RSP to be along a row or column of neighboring pixels to the current block at a position in an ellipse that includes the current sample.

Example 10

The method of any of examples 1-9, wherein determining the reference sample value comprises deriving the reference sample value by a derivation from reference samples in a neighborhood of the RSP.

Example 11

The method of any of examples 1-10, wherein determining the predicted value for the current sample comprises setting the predicted value equal to the reference sample value.

Example 12

The method of any of examples 1-10, wherein determining the predicted value for the current sample comprises:
setting the predicted value equal to the reference sample value; and
filtering samples in a neighborhood of the current sample to modify the predicted value for the current sample.

Example 13

The method of any of examples 1-12, wherein: the RSP is a first RSP for the current sample, the method further comprises: deriving a plurality of RSPs for the current sample, wherein deriving the plurality of RSPs includes deriving the first RSP for the current sample, determining a plurality of reference sample values for reference samples at the plurality of RSPs, determining the predicted value for the current sample comprises determining the predicted value for the current sample using the plurality of reference sample values.

Example 14

The method of any of examples 1-13, wherein coding comprises decoding.

Example 15

The method of any of examples 1-13, wherein coding comprises encoding.

Example 16

A device for coding video data, the device comprising one or more means for performing the method of any of examples 1-13.

Example 17

The device of example 16, wherein the one or more means comprise one or more processors implemented in circuitry.

Example 18

The device of any of examples 16 and 17, further comprising a memory to store the video data.

Example 19

The device of any of examples 16-18, further comprising a display configured to display decoded video data.

Example 20

The device of any of examples 16-19, wherein the device comprises one or more of a camera, a computer, a mobile device, a broadcast receiver device, or a set-top box.

Example 21

The device of any of examples 16-20, wherein the device comprises a video decoder.

Example 22

The device of any of examples 16-21, wherein the device comprises a video encoder.

Example 23

A computer-readable storage medium having stored thereon instructions that, when executed, cause one or more processors to perform the method of any of examples 1-13.

Example 24

A device for encoding video data, the device comprising: means for deriving a reference sample position (RSP) for a current sample of a current block; means for determining a reference sample value for a reference sample at the RSP; means for determining a predicted value for the current sample using the reference sample value; and means for coding the current sample using the predicted value.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   deriving a reference sample position (RSP) for a current sample of a current block according to one or more RSP derivation models, wherein the one or more RSP derivation models comprise a circular model, and wherein deriving the RSP according to the circular model comprises deriving the RSP to be along a row or column of neighboring pixels to the current block at a position having a radius from an upper-left neighboring pixel that is equal, or approximately equal, to a radius from the upper-left neighboring pixel or an upper-right neighboring pixel to the current sample within the current block;
   determining a reference sample value for a reference sample at the RSP;
   determining a predicted value for the current sample using the reference sample value; and
   coding the current sample using the predicted value.

2. The method of claim 1, wherein coding comprises encoding.

3. The method of claim 1, wherein coding comprises decoding.

4. The method of claim 1, further comprising coding a value for a syntax element representing the one or more RSP derivation models.

5. The method of claim 1, wherein deriving the RSP comprises selecting the one or more RSP derivation models based on one or more of a position of the current sample within the current block, a width of the current block, a height of the current block, a width of a neighboring block to the current block, a height of the neighboring block, an intra-prediction mode used to intra-predict the neighboring block, or an intra-prediction direction used to intra-predict the neighboring block.

6. The method of claim 1, wherein the one or more RSP derivation models further comprise an elliptical model, and wherein deriving the RSP according to the elliptical model comprises deriving the RSP to be along a row or column of neighboring pixels to the current block at a position in an ellipse, or approximately at a position in an ellipse, that includes the current sample and wherein the circular model is a special case of the elliptical model.

7. The method of claim 6, wherein the elliptical model is implemented using a look-up table.

8. The method of claim 1, wherein determining the reference sample value comprises deriving the reference sample value from a plurality of reference samples in a neighborhood of the RSP.

9. The method of claim 1, wherein determining the predicted value for the current sample comprises setting the predicted value equal to the reference sample value.

10. The method of claim 1, wherein determining the predicted value for the current sample comprises:
   setting the predicted value equal to the reference sample value; and
   filtering samples in a neighborhood of the current sample to modify the predicted value for the current sample.

11. The method of claim 1, wherein:
   the RSP is a first RSP for the current sample,
   the method further comprises:
      deriving a plurality of RSPs for the current sample, wherein deriving the plurality of RSPs includes deriving the first RSP for the current sample,
      determining a plurality of reference sample values for reference samples at the plurality of RSPs, and
      determining the predicted value for the current sample comprises determining the predicted value for the current sample using the plurality of reference sample values.

12. A device for coding video data, the device comprising:
   a memory configured to store a current block of the video data; and
   one or more processors coupled to the memory, the one or more processors configured to:
      derive an RSP for a current sample of the current block according to one or more RSP derivation models, wherein the one or more RSP derivation models comprise a circular model, and wherein the one or more processors are configured to derive the RSP according to the circular model by deriving the RSP to be along a row or column of neighboring pixels to the current block at a position having a radius from an upper-left neighboring pixel that is equal to a radius from the upper-left or upper-right neighboring pixel to the current sample within the current block;
      determine a reference sample value for a reference sample at the RSP;
      determine a predicted value for the current sample using the reference sample value; and
      code the current sample using the predicted value.

13. The device of claim 12, wherein the device comprises a video encoder and coding comprises encoding.

14. The device of claim 12, wherein the device comprises a video decoder and coding comprises decoding.

15. The device of claim 12, wherein the one or more processors are further configured to code a value for a syntax element representing the one or more RSP derivation models.

16. The device of claim 12, wherein the one or more processors are configured to derive the RSP by selecting the one or more RSP derivation models based on one or more of a position of the current sample within the current block, a width of the current block, a height of the current block, a width of a neighboring block to the current block, a height of the neighboring block, an intra-prediction mode used to intra-predict the neighboring block, or an intra-prediction direction used to intra-predict the neighboring block.

17. The device of claim 12, wherein the one or more RSP derivation models further comprise an elliptical model, and wherein the one or more processors are configured to derive the RSP according to the elliptical model by deriving the RSP to be along a row or column of neighboring pixels to the current block at a position in an ellipse that includes the current sample and wherein the circular model is a special case of the elliptical model.

18. The device of claim 17, wherein the elliptical model is implemented in a look-up table.

19. The device of claim 12, wherein the one or more processors are configured to determine the reference sample value by deriving the reference sample value from a plurality of reference samples in a neighborhood of the RSP.

20. The device of claim 12, wherein the one or more processors are configured to determine the predicted value for the current sample by setting the predicted value equal to the reference sample value.

21. The device of claim 12, wherein the one or more processors are configured to determine the predicted value for the current sample by:
   setting the predicted value equal to the reference sample value; and
   filtering samples in a neighborhood of the current sample to modify the predicted value for the current sample.

22. The device of claim 12, wherein:
   the RSP is a first RSP for the current sample;
   the one or more processors are further configured to:
      derive a plurality of RSPs for the current sample, wherein the plurality of RSPs comprises the first RSP for the current sample;
      determine a plurality of reference sample values for reference samples at the plurality of RSPs; and
      determine the predicted value for the current sample comprises determining the predicted value for the current sample using the plurality of reference sample values.

23. The device of claim 12, wherein the device is a wireless communication device.

24. A non-transitory computer-readable storage medium having stored thereon instructions that, when executed, cause one or more processors to:
   derive an RSP for a current sample of a current block according to one or more RSP derivation models, wherein the one or more RSP derivation models comprise a circular model, and wherein the one or more processors are configured to derive the RSP according to the circular model by deriving the RSP to be along a row or column of neighboring pixels to the current block at a position having a radius from an upper-left neighboring pixel that is equal to a radius from the upper-left or upper-right neighboring pixel to the current sample within the current block;

determine a reference sample value for a reference sample at the RSP;

determine a predicted value for the current sample using the reference sample value; and code the current sample using the predicted value.

25. The non-transitory computer-readable storage medium of claim 24, wherein coding comprises encoding.

26. The non-transitory computer-readable storage medium of claim 24, wherein coding comprises decoding.

27. The non-transitory computer-readable storage medium of claim 24, wherein the instructions, when executed further cause the one or more processors to code a value for a syntax element representing the one or more RSP derivation models.

28. The non-transitory computer-readable storage medium of claim 24, wherein the instructions, when executed further cause the one or more processors to derive the RSP by selecting the one or more RSP derivation models based on one or more of a position of the current sample within the current block, a width of the current block, a height of the current block, a width of a neighboring block to the current block, a height of the neighboring block, an intra-prediction mode used to intra-predict the neighboring block, or an intra-prediction direction used to intra-predict the neighboring block.

* * * * *